(12) United States Patent
Lim et al.

(10) Patent No.: US 12,113,732 B2
(45) Date of Patent: Oct. 8, 2024

(54) CONFIGURATION OF DATA UNIT FOR DUPLICATE TRANSMISSION

(71) Applicant: LG Electronics Inc., Seoul (KR)

(72) Inventors: Dongguk Lim, Seoul (KR); Jinyoung Chun, Seoul (KR); Jinsoo Choi, Seoul (KR); Eunsung Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/599,072

(22) Filed: Mar. 7, 2024

(65) Prior Publication Data

US 2024/0214140 A1 Jun. 27, 2024

Related U.S. Application Data

(63) Continuation of application No. 18/013,433, filed as application No. PCT/KR2021/008180 on Jun. 29, 2021.

(30) Foreign Application Priority Data

Jun. 30, 2020 (KR) .................. 10-2020-0080521
Jul. 1, 2020 (KR) .................. 10-2020-0081053
Jul. 2, 2020 (KR) .................. 10-2020-0081634
Sep. 7, 2020 (KR) .................. 10-2020-0114046

(51) Int. Cl.
*H04L 12/28* (2006.01)
*H04L 1/08* (2006.01)
*H04L 5/00* (2006.01)
*H04J 1/16* (2006.01)
*H04W 84/12* (2009.01)

(52) U.S. Cl.
CPC .............. *H04L 5/0044* (2013.01); *H04L 1/08* (2013.01); *H04W 84/12* (2013.01)

(58) Field of Classification Search
CPC ....... H04L 1/0003; H04L 1/08; H04L 5/0044; H04L 27/2602; H04W 72/0453; H04W 80/00; H04W 84/12
USPC ........................................ 370/252, 329, 430
See application file for complete search history.

(56) References Cited

U.S. PATENT DOCUMENTS

2019/0373586 A1* 12/2019 Verma .................. H04W 72/51
2020/0177425 A1* 6/2020 Chen .................. H04L 27/2602
2021/0258116 A1* 8/2021 Chen .................. H04L 27/2602

* cited by examiner

*Primary Examiner* — John Pezzlo
(74) *Attorney, Agent, or Firm* — Fish & Richardson P.C.

(57) ABSTRACT

The present specification proposes a technical feature for increasing a transmission range of a wireless LAN signal. The wireless LAN signal of the present specification, e.g. a transmission physical protocol data unit (PPDU), may be configured on the basis of a duplicate transmission mode. The transmission PPDU of the present specification may comprise a data unit duplicated in frequency. The data unit duplicated in frequency may be configured on the basis of a total bandwidth of the transmission PPDU. The transmission PPDU of the present specification proposes various training fields for the duplicated data unit.

15 Claims, 17 Drawing Sheets

(a)

(b)

PPDU Format (IEEE 802.11a/g)

HT PPDU Format (IEEE 802.11n)

VHT PPDU Format (IEEE 802.11ac)

FIG. 28
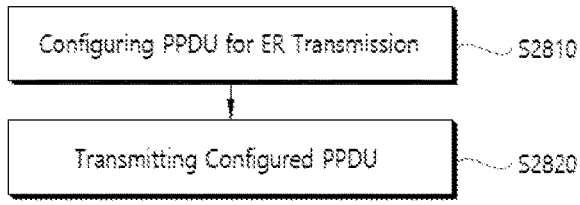
FIG. 29
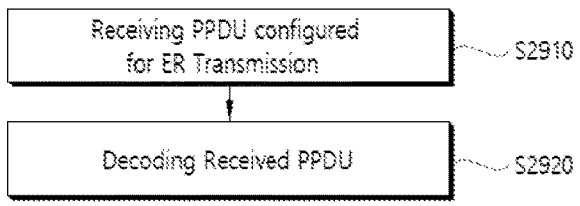
FIG. 30
| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

FIG. 31

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | 106 | | | | 26 | 26 | 26 | 26 | 26 | 8 |
| 01001$y_2y_1y_0$ | 106 | | | | 26 | 26 | 26 | 52 | | 8 |

FIG. 32

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000–0011 | 1–4 | 1 | | | | | | | 2–5 | 10 |
| | 0100–0110 | 2–4 | 2 | | | | | | | 4–6 | |
| | 0111–1000 | 3–4 | 3 | | | | | | | 6–7 | |
| | 1001 | 4 | 4 | | | | | | | 8 | |
| 3 | 0000–0011 | 1–4 | 1 | 1 | | | | | | 3–6 | 13 |
| | 0100–0110 | 2–4 | 2 | 1 | | | | | | 5–7 | |
| | 0111–1000 | 3–4 | 3 | 1 | | | | | | 7–8 | |
| | 1001–1011 | 2–4 | 2 | 2 | | | | | | 6–8 | |
| | 1100 | 3 | 3 | 2 | | | | | | 8 | |
| 4 | 0000–0011 | 1–4 | 1 | 1 | 1 | | | | | 4–7 | 11 |
| | 0100–0110 | 2–4 | 2 | 1 | 1 | | | | | 6–8 | |
| | 0111 | 3 | 3 | 1 | 1 | | | | | 8 | |
| | 1000–1001 | 2–3 | 2 | 2 | 1 | | | | | 7–8 | |
| | 1010 | 2 | 2 | 2 | 2 | | | | | 8 | |

FIG. 33

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000–0011 | 1–4 | 1 | 1 | 1 | 1 | | | | 5–8 | 7 |
| | 0100–0101 | 2–3 | 2 | 1 | 1 | 1 | | | | 7–8 | |
| | 0110 | 2 | 2 | 2 | 1 | 1 | | | | 8 | |
| 6 | 0000–0010 | 1–3 | 1 | 1 | 1 | 1 | 1 | | | 6–8 | 4 |
| | 0011 | 2 | 2 | 1 | 1 | 1 | 1 | | | 8 | |
| 7 | 0000–0001 | 1–2 | 1 | 1 | 1 | 1 | 1 | 1 | | 7–8 | 2 |
| 8 | 0000 | 1 | 1 | 1 | 1 | 1 | 1 | 1 | 1 | 8 | 1 |

FIG. 34

| Indices | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 | 52 | 1 |
| 2 | 26 | 26 | 26 | 26 | 26 | 52 | 52 | 26 | 26 | 1 |
| 3 | 26 | 26 | 26 | 26 | 26 | 52 | 52 | 52 | 52 | 1 |
| 4 | 26 | 26 | 52 | 52 | 26 | 26 | 26 | 26 | 26 | 1 |
| 5 | 26 | 26 | 52 | 52 | 26 | 26 | 26 | 52 | 52 | 1 |
| 6 | 26 | 26 | 52 | 52 | 26 | 52 | 52 | 26 | 26 | 1 |
| 7 | 26 | 26 | 52 | 52 | 26 | 52 | 52 | 52 | 52 | 1 |
| 8 | 52 | 52 | 26 | 26 | 26 | 26 | 26 | 26 | 26 | 1 |
| 9 | 52 | 52 | 26 | 26 | 26 | 26 | 26 | 52 | 52 | 1 |
| 10 | 52 | 52 | 26 | 26 | 26 | 52 | 52 | 26 | 26 | 1 |
| 11 | 52 | 52 | 26 | 26 | 26 | 52 | 52 | 52 | 52 | 1 |
| 12 | 52 | 52 | 52 | 52 | 26 | 26 | 26 | 26 | 26 | 1 |
| 13 | 52 | 52 | 52 | 52 | 26 | 26 | 26 | 52 | 52 | 1 |
| 14 | 52 | 52 | 52 | 52 | 26 | 52 | 52 | 26 | 26 | 1 |
| 15 | 52 | 52 | 52 | 52 | 26 | 52 | 52 | 52 | 52 | 1 |
| 16 | 26 | 26 | 26 | 26 | 26 | 106 | 106 | 106 | 106 | 1 |
| 17 | 26 | 26 | 52 | 52 | 26 | 106 | 106 | 106 | 106 | 1 |
| 18 | 52 | 52 | 26 | 26 | 26 | 106 | 106 | 106 | 106 | 1 |
| 19 | 52 | 52 | 52 | 52 | 26 | 106 | 106 | 106 | 106 | 1 |

FIG. 35

| Indices | #1 | #2 | #3 | #4 | #5 | #6 | #7 | #8 | #9 | Number of entries |
|---------|----|----|----|----|----|----|----|----|----|-------------------|
| 20 | 106 | | | | 26 | 26 | 26 | 26 | 26 | 1 |
| 21 | 106 | | | | 26 | 26 | 26 | 52 | | 1 |
| 22 | 106 | | | | 26 | 52 | | 26 | 26 | 1 |
| 23 | 106 | | | | 26 | 52 | | 52 | | 1 |
| 24 | 52 | | 52 | | -- | 52 | | 52 | | 1 |
| 25 | 242-tone RU empty (with zero users) | | | | | | | | | 1 |
| 26 | 106 | | | | 26 | 106 | | | | 1 |
| 27-34 | 242 | | | | | | | | | 8 |
| 35-42 | 484 | | | | | | | | | 8 |
| 43-50 | 996 | | | | | | | | | 8 |
| 51-58 | 2*996 | | | | | | | | | 8 |
| 59 | 26 | 26 | 26 | 26 | 26 | 52+26 | | | 26 | 1 |
| 60 | 26 | 26+52 | | 26 | 26 | 26 | 26 | 26 | | 1 |
| 61 | 26 | 26+52 | | 26 | 26 | 26 | 52 | | | 1 |
| 62 | 26 | 26+52 | | 26 | 52 | | 26 | 26 | | 1 |
| 63 | 26 | 26 | 52 | | 26 | 52+26 | | | 26 | 1 |
| 64 | 26 | 26+52 | | 26 | 52+26 | | | 26 | | 1 |
| 65 | 26 | 26+52 | | 26 | 52 | | 52 | | | 1 |

FIG. 36

| | | | | | | | | | | |
|---|---|---|---|---|---|---|---|---|---|---|
| 66 | 52 | | 26 | 26 | 26 | 52+26 | | | 26 | 1 |
| 67 | 52 | | 52 | | 26 | 52+26 | | | 26 | 1 |
| 68 | 52 | | 52+26 | | | 52 | | 52 | | 1 |
| 69 | 26 | 26 | 26 | 26 | 26+106 | | | | | 1 |
| 70 | 26 | 26+52 | | 26 | 106 | | | | | 1 |
| 71 | 26 | 26 | 52 | | 26+106 | | | | | 1 |
| 72 | 26 | 26+52 | | | 26+106 | | | | | 1 |
| 73 | 52 | | 26 | 26 | 26+106 | | | | | 1 |
| 74 | 52 | | 52 | | 26+106 | | | | | 1 |
| 75 | 106+26 | | | | 26 | 26 | 26 | 26 | | 1 |
| 76 | 106+26 | | | | 26 | 26 | 52 | | | 1 |
| 77 | 106+26 | | | | 52 | | 26 | 26 | | 1 |
| 78 | 106 | | | 26 | 52+26 | | | 26 | | 1 |
| 79 | 106+26 | | | | 52+26 | | | 26 | | 1 |
| 80 | 106+26 | | | | 52 | | 52 | | | 1 |
| 81 | 106+26 | | | | 106 | | | | | 1 |
| 82 | 106 | | | | 26+106 | | | | | 1 |

CONFIGURATION OF DATA UNIT FOR DUPLICATE TRANSMISSION

CROSS-REFERENCE TO RELATED APPLICATIONS

This application is a continuation of U.S. application Ser. No. 18/013,433, filed on Jan. 25, 2023, which is a National Stage application under 35 U.S.C. § 371 of International Application No. PCT/KR2021/008180, filed on Jun. 29, 2021, which claims the benefit of Korean Patent Application No. 10-2020-0080521, filed on Jun. 30, 2020, Korean Patent Application No. 10-2020-0081053, filed on Jul. 1, 2020, Korean Patent Application No. 10-2020-0081634, filed on Jul. 2, 2020, and Korean Patent Application No. 10-2020-0114046, filed on Sep. 7, 2020. The disclosures of the prior applications are incorporated by reference in their entirety.

TECHNICAL FIELD

The present specification relates to a wireless LAN system, and more specifically, to the configuration of a data unit for duplicate transmission.

BACKGROUND

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In order to support a high throughput and a high data rate, the EHT standard may use a wide bandwidth (e.g., 160/320 MHz), 16 streams, and/or a multi-link (or multi-band) operation or the like.

In the EHT standard, a wide bandwidth (e.g., 160/240/320 MHZ) may be used for high throughput. Also, in order to efficiently use the bandwidth, preamble puncturing and multiple RU transmission may be used.

SUMMARY

In the new wireless LAN standard, various technical features are being discussed to extend signal transmission. The present specification proposes various technical features that extend the transmission range of a wireless LAN signal.

Technical features of the present specification relate to technical features performed by a station (STA) of a wireless local area network (LAN). A station (STA) based on the present specification may configure a transmission physical protocol data unit (PPDU) based on a duplicate transmission mode.

For example, the transmission PPDU may include a first control signal field for interpreting the transmission PPDU, a short training field (STF), a long training field (LTF), and a data field.

For example, the first control signal field may include a type field including a type value related to the duplicate transmission mode.

For example, the data field may include a first data RU including a tone for half of the total bandwidth of the transmission PPDU and a second data RU in which the first data RU is duplicated in frequency.

For example, the STF may be configured based on an STF sequence predefined/preconfigured for the total bandwidth.

For example, the LTF may be configured based on an LTF sequence redefined/preconfigured for the total bandwidth.

Technical features of the present specification can extend the transmission range of a wireless LAN signal (e.g., PPDU). For example, when transmission power is limited in a specific band (e.g., 6 GHz band), the technical features of the present specification may be applied to a signal transmitted in the corresponding band. Through this, it is possible to stably transmit and receive signals even in a band where transmission power is limited.

BRIEF DESCRIPTION OF THE DRAWINGS

FIG. 28 is a procedure flow diagram illustrating operations performed on a transmitting STA.

FIG. 29 is a procedure flow diagram illustrating operations performed in a receiving STA.

FIG. 30 illustrates an embodiment related to RU allocation information.

FIG. 31 illustrates an embodiment related to RU allocation information.

FIG. 32 illustrates an embodiment related to the number of spatial streams allocated to the plurality of user STAs which are allocated based on the MU-MIMO scheme FIG. 33 illustrates an embodiment related to the number of spatial streams allocated to the plurality of user STAs which are allocated based on the MU-MIMO scheme FIG. 34 illustrates an embodiment related to N-bit information for various RU allocations.

FIG. 35 illustrates an embodiment related to N-bit information for various RU allocations.

FIG. 36 illustrates an embodiment related to N-bit information for various RU allocations.

DETAILED DESCRIPTION

Figure 1:
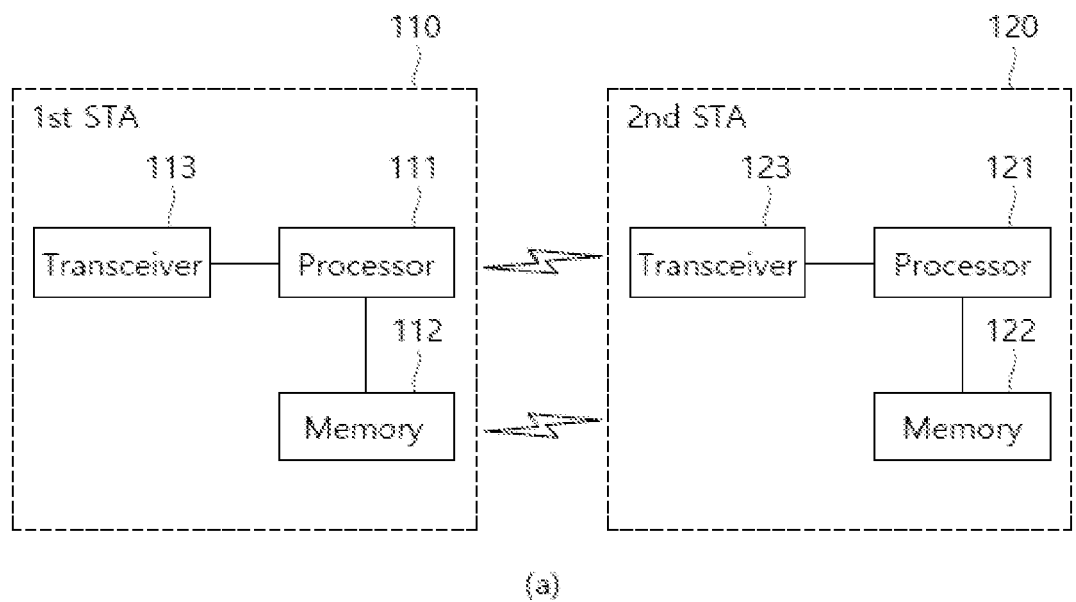
FIG. 1 shows an example of a transmitting apparatus and/or receiving apparatus of the present specification.
Figure 1:
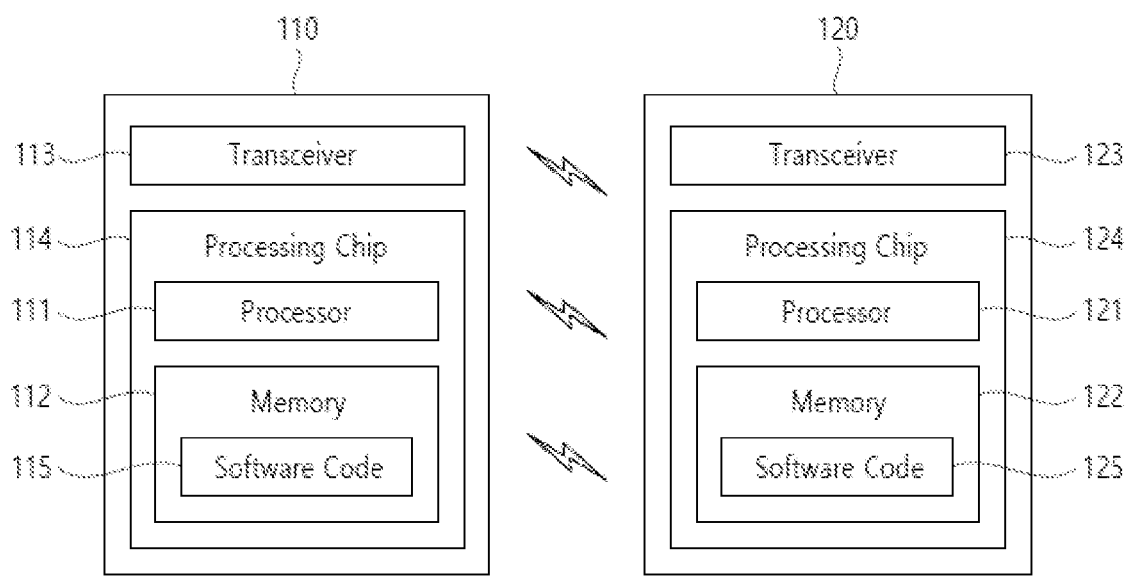

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP. In the present specification, the AP may be indicated as an AP STA.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, an STA1, an STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation for applied the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an AP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
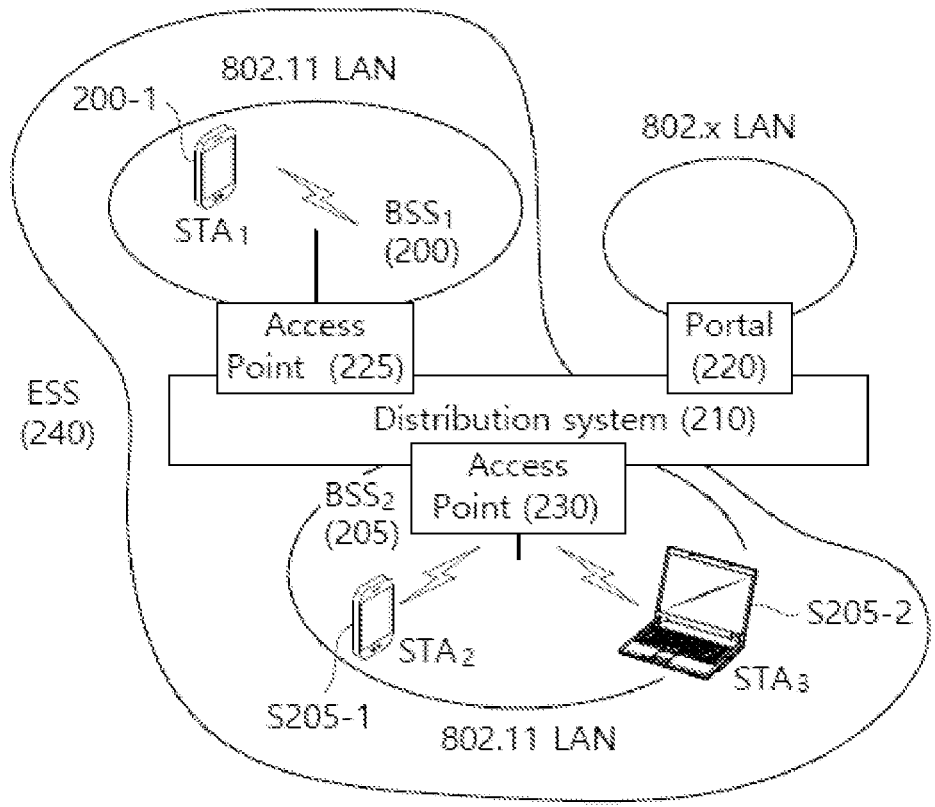
FIG. 2 is a conceptual view illustrating the structure of a wireless local area network (WLAN).
Figure 2:
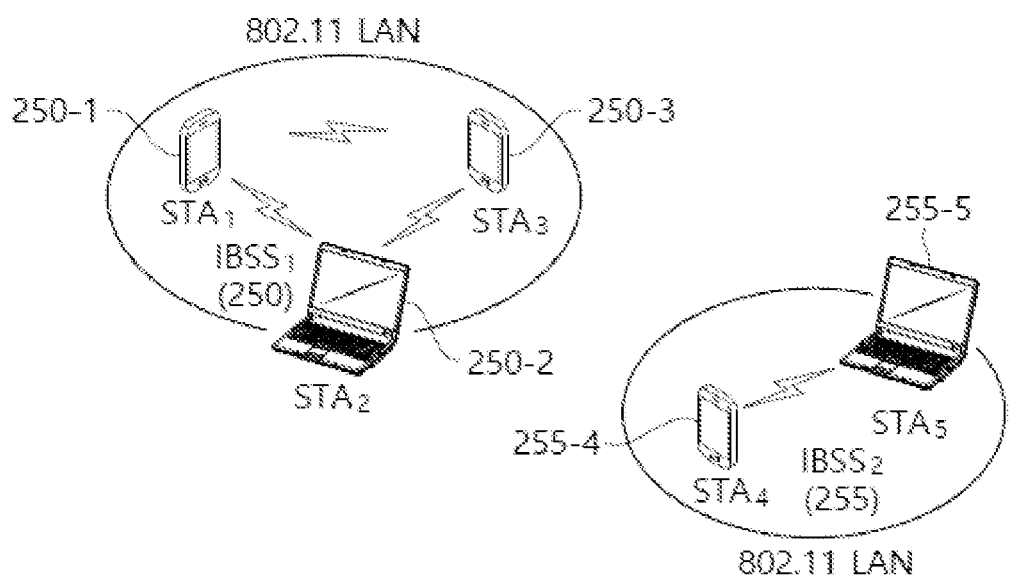

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and an STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
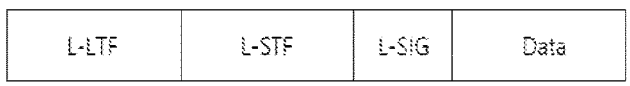
FIG. 3 illustrates an example of a PPDU used in an IEEE standard.
Figure 3:
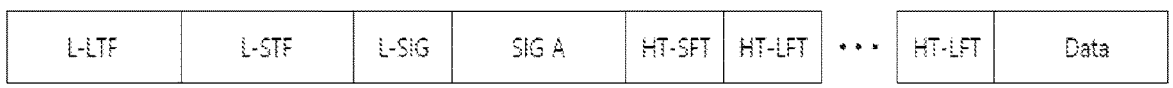
Figure 3:
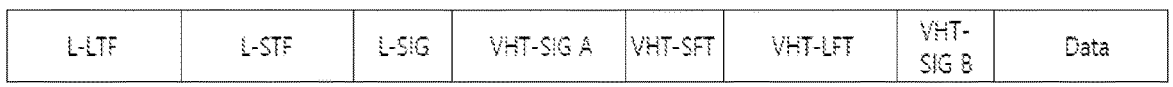
Figure 3:
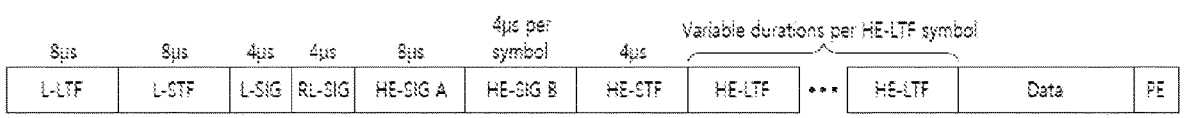

FIG. 3 illustrates an example of a PPDU used in an IEEE standard.

As illustrated in FIG. 3, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 3 also includes an example of an HE PPDU according to IEEE 802.11ax. The HE PPDU according to FIG. 3 is an illustrative PPDU for multiple users. An HE-SIG-B may be included only in a PPDU for multiple users, and an HE-SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, a MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 4:
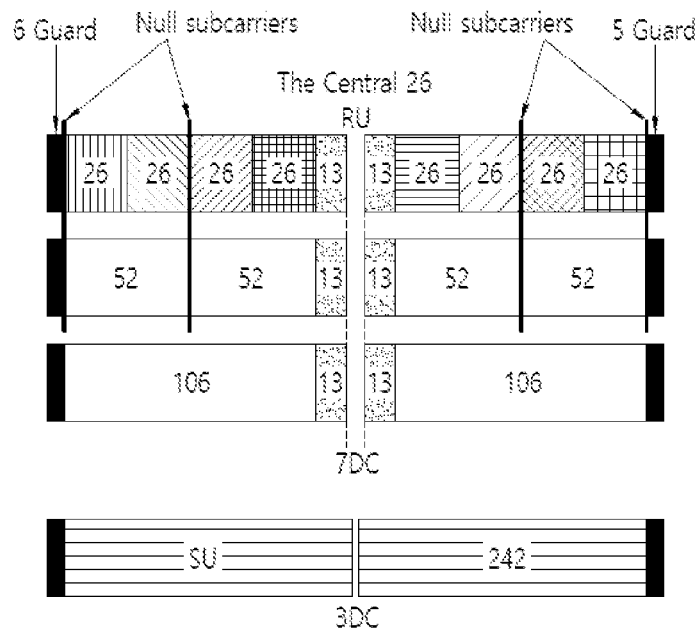
FIG. 4 illustrates a layout of resource units (RUs) used in a band of 20 MHz.

FIG. 4 illustrates a layout of resource units (RUs) used in a band of 20 MHZ.

As illustrated in FIG. 4, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 4, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 4 may be used not only for a multiple users (MUs) but also for a single user (SU), in which case one 242-unit may be used and three DC tones may be inserted as illustrated in the lowermost part of FIG. 4.

Although FIG. 4 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 5:
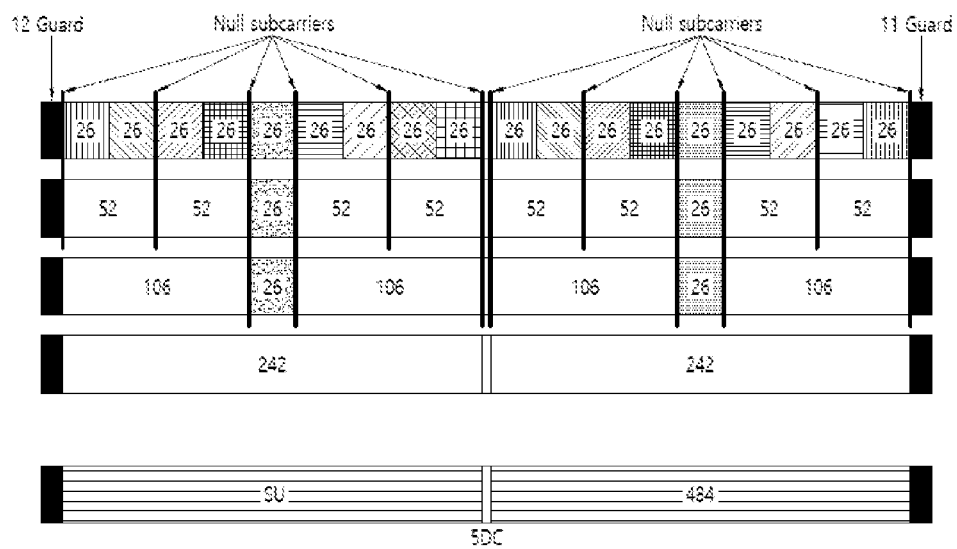
FIG. 5 illustrates a layout of RUs used in a band of 40 MHz.

FIG. 5 illustrates a layout of RUs used in a band of 40 MHz.

Similar to FIG. 4 in which RUs having various sizes are used, a 26-RU, a 52-RU, a 106-RU, a 242-RU, a 484-RU, and the like may be used in an example of FIG. 5. Further, five DC tones may be inserted in a center frequency, 12 tones may be used for a guard band in the leftmost band of the 40 MHz band, and 11 tones may be used for a guard band in the rightmost band of the 40 MHz band.

As illustrated, when the layout of the RUs is used for a single user, a 484-RU may be used. The specific number of RUs may be changed similar to FIG. 5.

Figure 6:
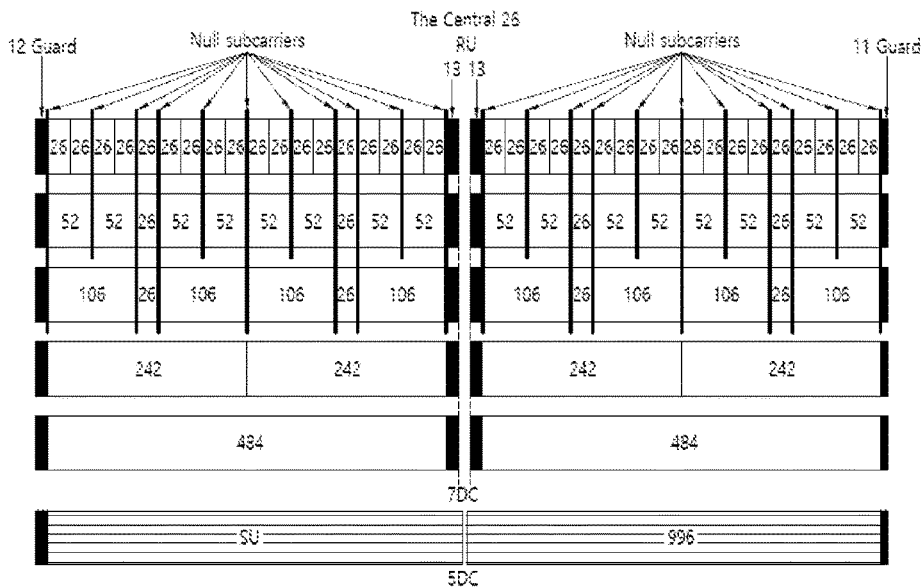
FIG. 6 illustrates a layout of RUs used in a band of 80 MHz.

FIG. 6 illustrates a layout of RUs used in a band of 80 MHZ.

Similar to FIG. 4 and FIG. 5 in which RUs having various sizes are used, a 26-RU, a 52-RU, a 106-RU, a 242-RU, a 484-RU, a 996-RU, and the like may be used in an example of FIG. 6. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 7:
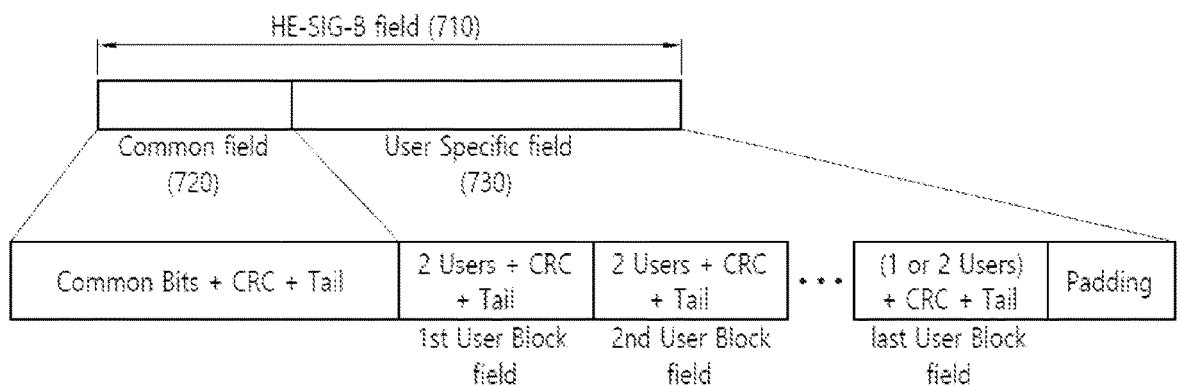
FIG. 7 illustrates a structure of an HE-SIG-B field.

FIG. 7 illustrates a structure of an HE-SIG-B field.

As illustrated, an HE-SIG-B field 710 includes a common field 720 and a user-specific field 730. The common field 720 may include information commonly applied to all users (i.e., user STAs) which receive SIG-B. The user-specific field 730 may be called a user-specific control field. When the SIG-B is transferred to a plurality of users, the user-specific field 730 may be applied only any one of the plurality of users.

As illustrated, the common field 720 and the user-specific field 730 may be separately encoded.

The common field 720 may include RU allocation information of N*8 bits. For example, the RU allocation information may include information related to a location of an RU. For example, when a 20 MHz channel is used as shown in FIG. 4, the RU allocation information may include information related to a specific frequency band to which a specific RU (26-RU/52-RU/106-RU) is arranged.

An example of a case in which the RU allocation information consists of 8 bits is as follows.

As shown the example of FIG. 4, up to nine 26-RUs may be allocated to the 20 MHZ channel. When the RU allocation information of the common field 720 is set to "00000000" as shown in FIG. 30, the nine 26-RUs may be allocated to a corresponding channel (i.e., 20 MHZ). In addition, when the RU allocation information of the common field 720 is set to "00000001" as shown in FIG. 30, seven 26-RUs and one 52-RU are arranged in a corresponding channel. That is, in the example of FIG. 4, the 52-RU may be allocated to the rightmost side, and the seven 26-RUs may be allocated to the left thereof.

The example of FIG. 30 shows only some of RU locations capable of displaying the RU allocation information.

For example, the RU allocation information may include an example of FIG. 31 below.

"01000y2y1y0" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information (y2y1y0). For example, when the 3-bit information (y2y1y0) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 7, the user-specific field 730 may include a plurality of user fields. As described above, the number of STAs (e.g., user STAs) allocated to a specific channel may be determined based on the RU allocation information of the common field 720. For example, when the RU allocation information of the common field 720 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 8.

Figure 8:
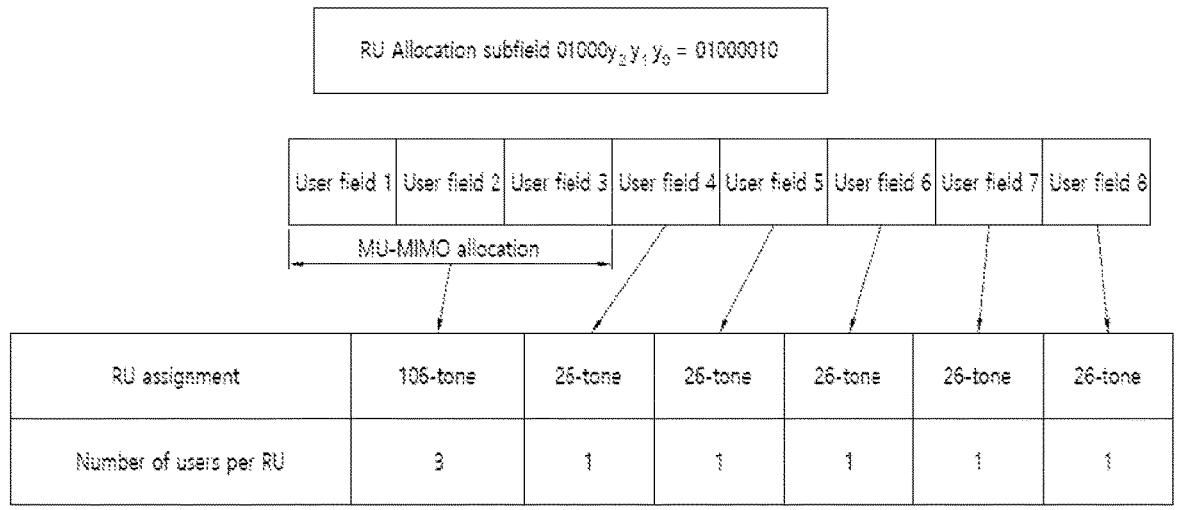
FIG. 8 illustrates an example in which a plurality of user STAs are allocated to the same RU through a MU-MIMO scheme.

FIG. 8 illustrates an example in which a plurality of user STAs are allocated to the same RU through a MU-MIMO scheme.

For example, when RU allocation is set to "01000010" as shown in FIG. 7, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 730 of HE-SIG-B may include eight user fields.

Figure 9:
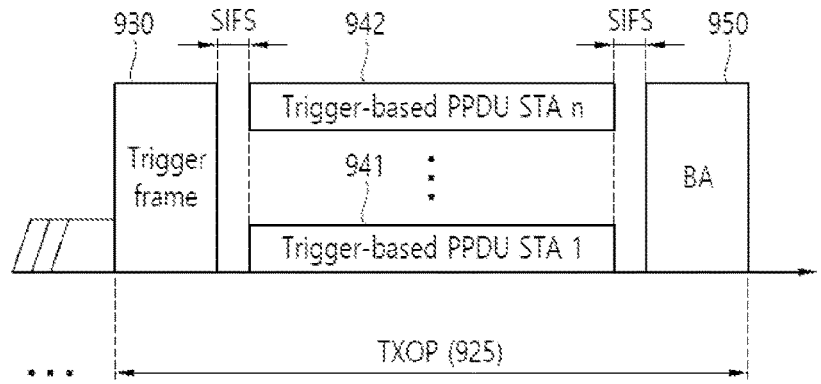
FIG. 9 illustrates an operation based on UL-MU.

The eight user fields may be expressed in the order shown in FIG. 9. In addition, as shown in FIG. 7, two user fields may be implemented with one user block field.

The user fields shown in FIG. 7 and FIG. 8 may be configured based on two formats. That is, a user field related to a MU-MIMO scheme may be configured in a first format, and a user field related to a non-MIMO scheme may be configured in a second format. Referring to the example of FIG. 8, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in FIG. 32 and FIG. 33 below.

As shown in FIG. 32 and/or FIG. 33, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 8, N_user is set to "3". Therefore, values of N_STS[1], N_STS[2], and N_STS[3] may be determined as shown in FIG. 32. For example, when a value of the second bit (B11-B14) is "0011", it may be set to N_STS[1]=4, N_STS[2]=1, N_STS[3]=1. That is, in the example of FIG. 8, four spatial streams may be allocated to the user field 1, one spatial stream may be allocated to the user field 1, and one spatial stream may be allocated to the user field 3.

As shown in the example of FIG. 32 and/or FIG. 33, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

FIG. 9 illustrates an operation based on UL-MU. As illustrated, a transmitting STA (e.g., AP) may perform channel access through contending (e.g., a backoff operation), and may transmit a trigger frame 930. That is, the transmitting STA may transmit a PPDU including the trigger frame 930. Upon receiving the PPDU including the trigger frame, a trigger-based (TB) PPDU is transmitted after a delay corresponding to SIFS.

TB PPDUs 941 and 942 may be transmitted at the same time period, and may be transmitted from a plurality of STAs (e.g., user STAs) having AIDs indicated in the trigger frame 930. An ACK frame 950 for the TB PPDU may be implemented in various forms.

Figure 10:
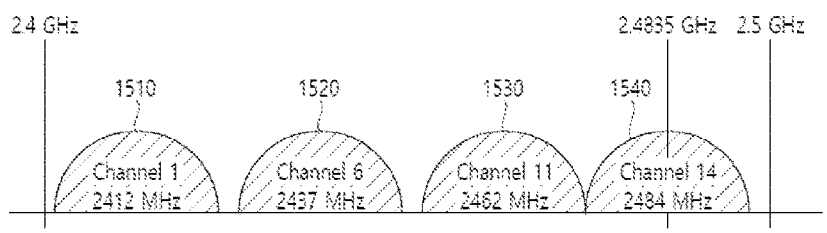
FIG. 10 illustrates an example of a channel used/supported/defined within a 2.4 GHz band.

FIG. 10 illustrates an example of a channel used/supported/defined within a 2.4 GHZ band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHZ within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 10 exemplifies 4 channels within a 2.4 GHz band. Each of 1st to 4th frequency domains 1010 to 1040 shown herein may include one channel. For example, the 1st frequency domain 1010 may include a channel 1 (a 20 MHz channel having an index 1). In this case, a center frequency of the channel 1 may be set to 2412 MHz. The 2nd frequency domain 1020 may include a channel 6. In this case, a center frequency of the channel 6 may be set to 2437 MHz. The 3rd frequency domain 1030 may include a channel 11. In this case, a center frequency of the channel 11 may be set to 2462 MHz. The 4th frequency domain 1040 may include a channel 14. In this case, a center frequency of the channel 14 may be set to 2484 MHZ.

Figure 11:
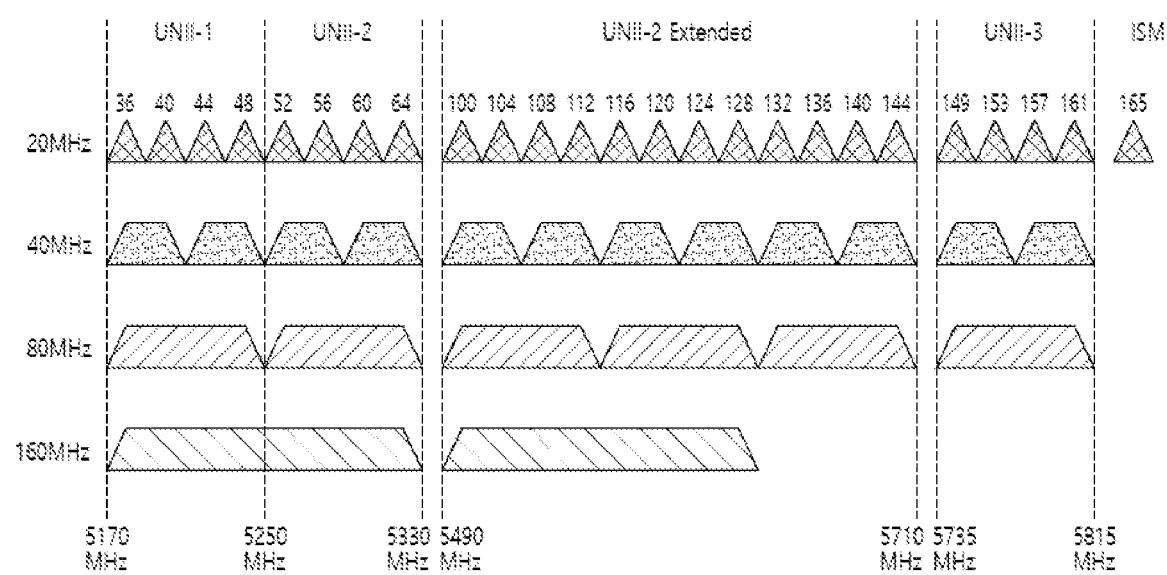
FIG. 11 illustrates an example of a channel used/supported/defined within a 5 GHz band.

FIG. 11 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHZ) are used/supported/defined. Alternatively, the 5 GHz band may include a plurality of channels between 4.5 GHz and 5.5 GHz. A specific numerical value shown in FIG. 11 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHZ, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figures 12, 13:
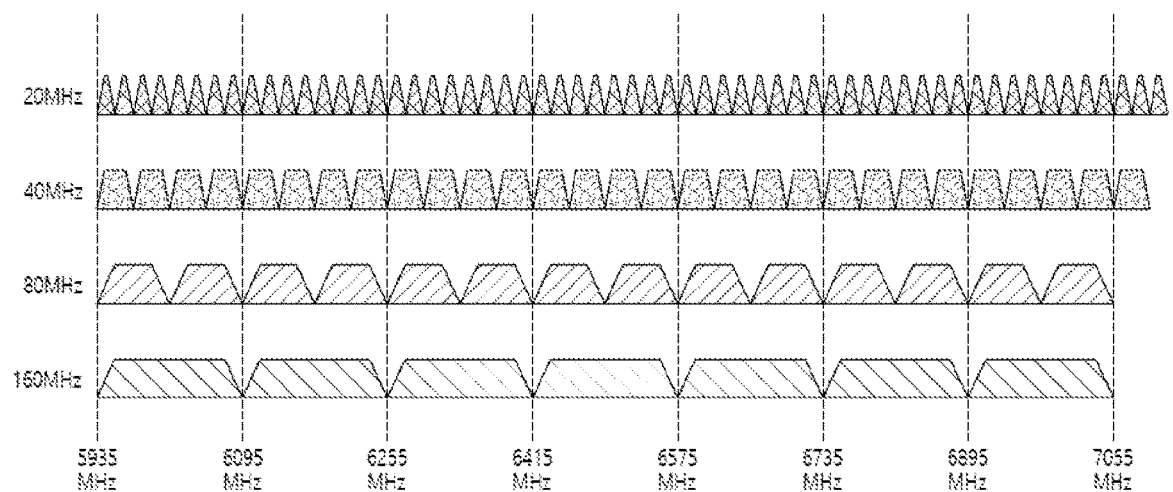
FIG. 12 illustrates an example of a channel used/supported/defined within a 6 GHz band.
FIG. 13 illustrates an example of a PPDU used in the present specification.

FIG. 12 illustrates an example of a channel used/supported/defined within a 6 GHZ band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 12 may be changed.

For example, the 20 MHz channel of FIG. 12 may be defined starting from 5.940 GHz. Specifically, among 20 MHz channels of FIG. 12, the leftmost channel may have an index 1 (or a channel index, a channel number, etc.), and 5.945 GHz may be assigned as a center frequency. That is, a center frequency of a channel of an index N may be determined as (5.940+0.005*N)GHz.

Accordingly, an index (or channel number) of the 2 MHz channel of FIG. 12 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHZ channel of FIG. 13 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 12, a 240 MHz channel or a 320 MHz channel may be additionally added.

Hereinafter, a PPDU transmitted/received in an STA of the present specification will be described.

FIG. 13 illustrates an example of a PPDU used in the present specification.

The PPDU of FIG. 13 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

Figure 14:
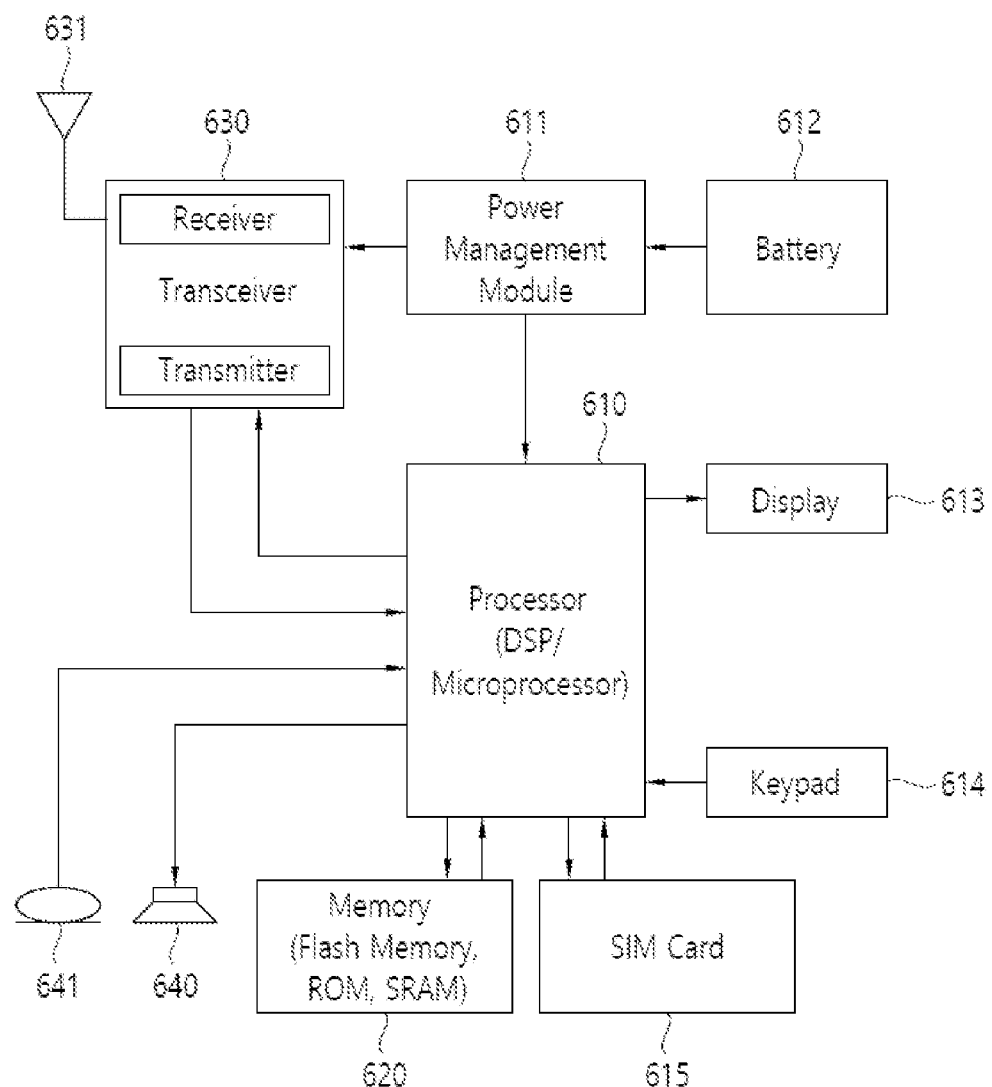
FIG. 14 illustrates an example of a modified transmission device and/or receiving device of the present specification.

The PPDU of FIG. 13 may indicate the entirety or part of a PPDU type used in the EHT system. For example, the example of FIG. 13 may be used for both of a single-user (SU) mode and a multi-user (MU) mode. In other words, the PPDU of FIG. 13 may be a PPDU for one receiving STA or a plurality of receiving STAs. When the PPDU of FIG. 14 is used for a trigger-based (TB) mode, the EHT-SIG of FIG. 13 may be omitted. In other words, an STA which has received a trigger frame for uplink-MU (UL-MU) may transmit the PPDU in which the EHT-SIG is omitted in the example of FIG. 13.

In FIG. 13, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 13 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 13, the L-LTF and the L-STF may be the same as those in the conventional fields.

The L-SIG field of FIG. 13 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation in the frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 13. The U-SIG may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 us. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIG may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, '000000'.

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 14. The preamble puncturing implies that puncturing is applied to part (e.g., a secondary 20 MHz band) of the full band. For example, when an 80 MHz PPDU is transmitted, an STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHZ band included in the 80 MHaz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHZ, the PPDU may include a first U-SIG for a first 80 MHZ band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHZ PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 13 may include control information for the receiving STA. The EHT-SIG may be transmitted through at least one symbol, and one symbol may have a length of 4 us. Information related to the number of symbols used for the EHT-SIG may be included in the U-SIG.

The EHT-SIG may include a technical feature of the HE-SIG-B described with reference to FIG. 7 and FIG. 8. For example, the EHT-SIG may include a common field and a user-specific field as in the example of FIG. 7. The common field of the EHT-SIG may be omitted, and the number of user-specific fields may be determined based on the number of users.

As in the example of FIG. 7, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 8, each user field may be related to MU-MIMO allocation, or may be related to non-MU-MIMO allocation.

As in the example of FIG. 7, the common field of the EHT-SIG may include a CRC bit and a tail bit. A length of the CRC bit may be determined as 4 bits. A length of the tail bit may be determined as 6 bits, and may be set to '000000'.

As in the example of FIG. 7, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in FIG. 30.

The example of FIG. 34 to FIG. 36 is an example of 8-bit (or N-bit) information for various RU allocations. An index shown in each table may be modified, and some entries in FIG. 34 to FIG. 36 may be omitted, and entries (not shown) may be added.

The example of FIG. 34 to FIG. 36 relates to information related to a location of an RU allocated to a 20 MHz band. For example, 'an index 0' of FIG. 34 may be used in a situation where nine 26-RUs are individually allocated (e.g., in a situation where nine 26-RUs shown in FIG. 5 are individually allocated).

Meanwhile, a plurality or RUs may be allocated to one STA in the EHT system. For example, regarding 'an index 60' of FIG. 35, one 26-RU may be allocated for one user (i.e., receiving STA) to the leftmost side of the 20 MHz band, one 26-RU and one 52-RU may be allocated to the right side thereof, and five 26-RUs may be individually allocated to the right side thereof.

A mode in which the common field of the EHT-SIG is omitted may be supported. The mode in which the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of consecutive tones, and a second modulation scheme may be applied to the remaining half of the consecutive tones. That is, a transmitting STA may use the first modulation scheme to modulate specific control information through a first symbol and allocate it to half of the consecutive tones, and may use the second modulation scheme to modulate the same control information by using a second symbol and allocate it to the remaining half of the consecutive tones. As described above, information (e.g., a 1-bit field) regarding whether the DCM scheme is applied to the EHT-SIG may be included in the U-SIG.

An HE-STF of FIG. 13 may be used for improving automatic gain control estimation in a multiple input multiple output (MIMO) environment or an OFDMA environment. An HE-LTF of FIG. 13 may be used for estimating a channel in the MIMO environment or the OFDMA environment.

A PPDU (e.g., EHT-PPDU) of FIG. 13 may be configured based on the example of FIG. 4 and FIG. 5.

For example, an EHT PPDU transmitted on a 20 MHz band, i.e., a 20 MHz EHT PPDU, may be configured based on the RU of FIG. 4. That is, a location of an RU of EHT-STF, EHT-LTF, and data fields included in the EHT PPDU may be determined as shown in FIG. 4.

An EHT PPDU transmitted on a 40 MHz band, i.e., a 40 MHz EHT PPDU, may be configured based on the RU of FIG. 5. That is, a location of an RU of EHT-STF, EHT-LTF, and data fields included in the EHT PPDU may be determined as shown in FIG. 5.

Since the RU location of FIG. 5 corresponds to 40 MHZ, a tone-plan for 80 MHz may be determined when the pattern of FIG. 6 is repeated twice. That is, an 80 MHZ EHT PPDU may be transmitted based on a new tone-plan in which not the RU of FIG. 6 but the RU of FIG. 5 is repeated twice.

When the pattern of FIG. 5 is repeated twice, 23 tones (i.e., 11 guard tones+12 guard tones) may be configured in a DC region. That is, a tone-plan for an 80 MHZ EHT PPDU allocated based on OFDMA may have 23 DC tones. Unlike this, an 80 MHZ EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 5 is repeated several times.

The PPDU of FIG. 13 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 13. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2."

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0," the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 13. The PPDU of FIG. 13 may be used to transmit/receive frames of various types. For example, the PPDU of FIG. 13 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 14 may be used for a management frame. An example of the management frame may include a beacon frame, a (re-)association request frame, a (re-)association response frame, a probe request frame, and a probe response frame. For example, the PPDU of FIG. 13 may be used for a data frame. For example, the PPDU of FIG. 13 may be used to simultaneously transmit at least two or more of the control frame, the management frame, and the data frame.

FIG. 14 illustrates an example of a modified transmission device and/or receiving device of the present specification.

Figure 15:
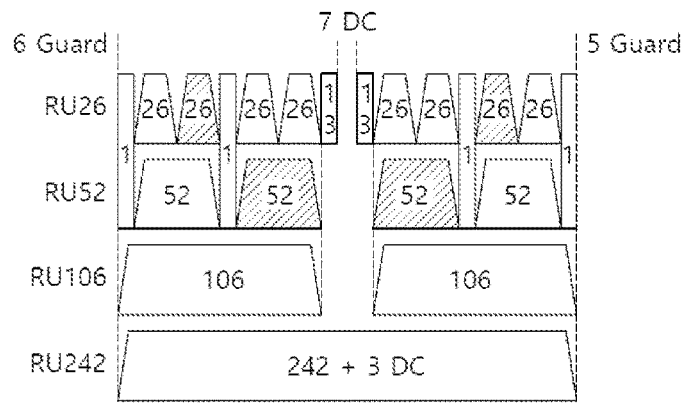
FIG. 15 shows an example of an aggregation of RU26 and RU52 in 20 MHz.

Each device/STA of the sub-figure (a)/(b) of FIG. 1 may be modified as shown in FIG. 15. A transceiver 630 of FIG. 14 may be identical to the transceivers 113 and 123 of FIG. 1. The transceiver 630 of FIG. 14 may include a receiver and a transmitter.

A processor 610 of FIG. 14 may be identical to the processors 111 and 121 of FIG. 1. Alternatively, the processor 610 of FIG. 14 may be identical to the processing chips 114 and 124 of FIG. 1.

A memory 620 of FIG. 14 may be identical to the memories 112 and 122 of FIG. 1. Alternatively, the memory 620 of FIG. 14 may be a separate external memory different from the memories 112 and 122 of FIG. 1.

Referring to FIG. 14, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 14, a speaker 640 may output a result related to a sound processed by the processor 610. A microphone 641 may receive an input related to a sound to be used by the processor 610.

Hereinafter, technical features applicable to the EHT standard may be described.

According to an embodiment, in the EHT standard, a PPDU of a 320 MHz bandwidth may be supported. In addition, 240 MHz and 160+80 MHz transmission may be supported. The 240 MHz and 160+80 MHz may be configured by applying preamble puncturing of 320 MHz to 80 MHz. For example, the 240 MHz and 160+80 MHz bandwidths may be configured based on three 80 MHz channels including the primary 80 MHz.

According to an embodiment, in the EHT standard, an 11ax standard tone plan may be used for a 20/40/80/160 MHz PPDU. According to an embodiment, a 160 MHz OFDMA tone plan of the 11ax standard may be duplicated and used for a 320 MHz PPDU.

According to an embodiment, the 240 MHz and 160+80 MHz transmission may be composed of three 80 MHz segments. According to an embodiment, the 160 MHz tone plan may be duplicated and used for the non-OFDMA tone plan of the 320 MHz PPDU.

According to an embodiment, in each 160 MHz segment for the non-OFDMA tone plan of the 320 MHz PPDU, 12 null tones and 11 null tones may be configured on the leftmost and rightmost sides, respectively.

According to an embodiment, in each 160 MHz segment for a non-OFDMA tone plan of a 320/160+160 MHz PPDU, 12 null tones and 11 null tones may be configured on the leftmost and rightmost sides, respectively.

According to an embodiment of the present specification, the data part of the EHT PPDU may use the same subcarrier spacing as the data part of the IEEE 802.11ax standard.

Hereinafter, technical features of a resource unit (RU) applicable to the EHT standard will be described.

According to an embodiment of the present specification, in the EHT standard, one or more RUs may be allocated to a single STA. For example, coding and interleaving schemes for multiple RUs allocated to a single STA may be variously set.

According to an embodiment of the present specification, small-size RUs may be aggregated with other small-size RUs. According to an embodiment of the present specification, large-size RUs may be aggregated with other large-size RUs.

For example, RUs of 242 tones or more may be defined/set as 'large size RUs'. For another example, RUs of less than 242 tones may be defined/configured as 'small size RUs'.

According to an embodiment of the present specification, there may be one PSDU per STA for each link. According to an embodiment of the present specification, for LDPC encoding, one encoder may be used for each PSDU.

Small-Size RUs

According to an embodiment of the present specification, an aggregation of small-size RUs may be set so as not to cross a 20 MHz channel boundary. For example, RU106+RU26 and RU52+RU26 may be configured as an aggregation of small-size RUs.

According to an embodiment of the present specification, in PPDUs of 20 MHz and 40 MHz, contiguous RU26 and RU106 may be aggregated/combined within a 20 MHz boundary.

According to an embodiment of the present specification, in PPDUs of 20 MHz and 40 MHz, RU26 and RU52 may be aggregated/combined.

Figure 21:
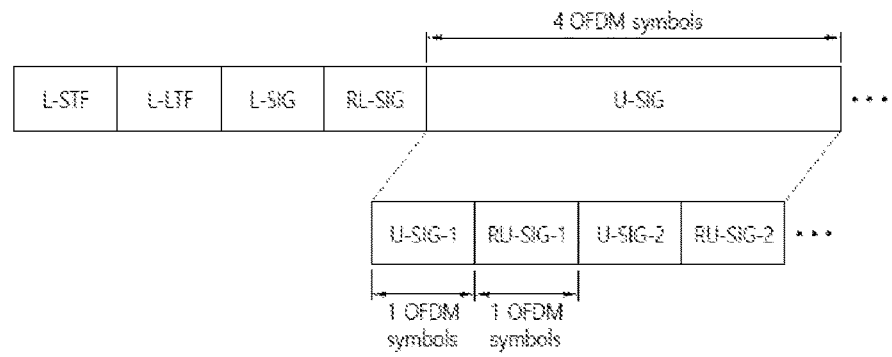
FIG. 21 is another example in which symbols for the first control signal field are repeated.

For example, in 20 MHZ (or 20 MHz PPDU), an example of contiguous RU26 and RU52 may be shown through FIG. 21.

FIG. 15 shows an example of an aggregation of RU26 and RU52 in 20 MHz.

Referring to FIG. 15, shaded RU26 and RU52 may be aggregated. For example, the second RU26 and the second RU52 may be aggregated. For another example, the seventh RU and the third RU52 may be aggregated.

For example, in 40 MHz, an example of contiguous RU26 and RU52 is described in FIG. 15.

Figure 16:
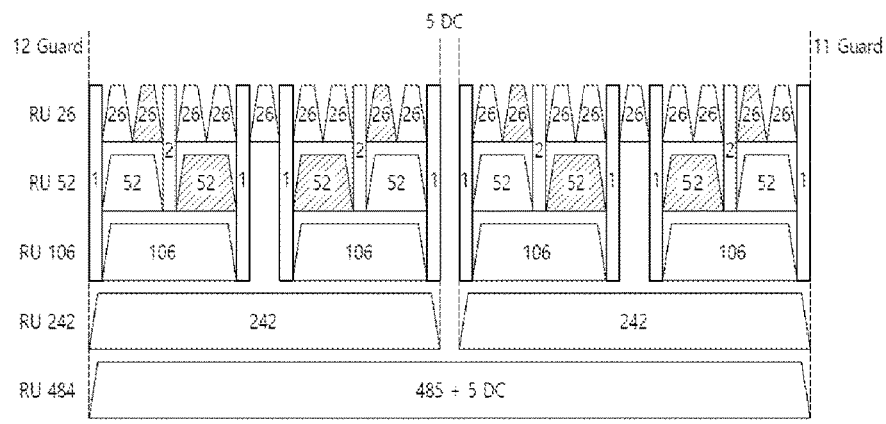
FIG. 16 shows an example of an aggregation of RU26 and RU52 in 40 MHz.

FIG. 16 shows an example of an aggregation of RU26 and RU52 in 40 MHz.

Referring to FIG. 16, shaded RU26 and RU52 may be aggregated. For example, the second RU26 and the second RU52 may be aggregated. For another example, the eighth RU26 and the third RU52 may be aggregated. For another example, the eleventh RU26 and the sixth RU52 may be aggregated. For another example, the seventeenth RU26 and the seventh RU52 may be aggregated.

According to an embodiment of the present specification, RU26 and RU52 may be aggregated/combined in a PPDU of 80 MHz.

Figure 17:
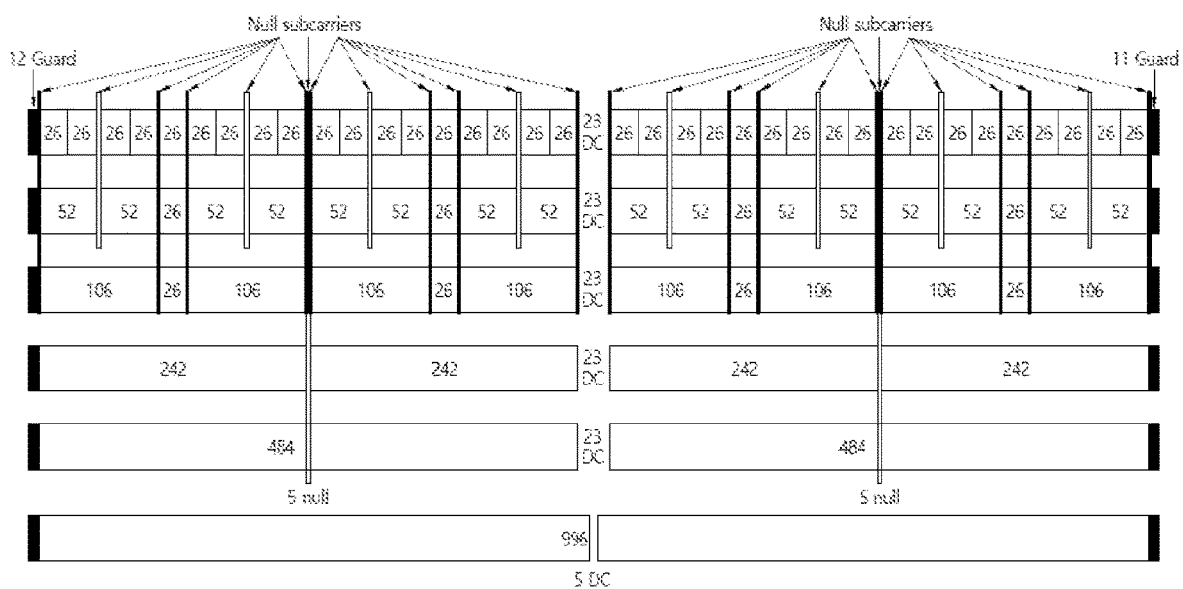
FIG. 17 shows an example of an aggregation of RU26 and RU52 in 80 MHz.

For example, an example of contiguous RU26 and RU52 in 80 MHz may be shown by FIG. 17.

FIG. 17 shows an example of an aggregation of RU26 and RU52 in 80 MHz.

Referring to FIG. 17, 80 MHz may be divided into the first 40 MHz and the second 40 MHz. For example, within the first 40 MHZ, the 8th RU26 and the 3rd RU52 may be aggregated. For another example, within the first 40 MHZ, the 11th RU26 and the 6th RU52 may be aggregated. For another example, within the second 40 MHZ, the 8th RU26 and the 3rd RU52 may be aggregated. For another example, within the second 40 MHZ, the 11th RU26 and the 6th RU52 may be aggregated.

According to an embodiment, when LDPC coding is applied, a single tone mapper may be used for RUs having less than 242 tones.

Large-Size RUs

According to an embodiment, in OFDMA transmission of 320 MHz for a single STA, an aggregation of a large-size RUs may be allowed only within a primary 160 MHz or a secondary 160 MHz. For example, the primary 160 MHz (channel) may consist of a primary 80 MHz (channel) and a secondary 80 MHz (channel). The secondary 160 MHz (channel) can be configured with channels other than the primary 160 MHz.

According to an embodiment, in OFDMA transmission of 240 MHz for a single STA, an aggregated of large-size RUs may be allowed only within 160 MHz (band/channel), and the 160 MHz may consist of two adjacent 80 MHz channels.

According to an embodiment, in OFDMA transmission of 160+80 MHz for a single STA, an aggregation of large-size RUs may be allowed only within a continuous 160 MHz (band/channel) or within the remaining 80 MHz (band/channel).

In 160 MHz OFDMA, an aggregation of large-size RUs configured as shown in Table 1 may be supported.

TABLE 1

| RU size | Aggregate BW | Notes |
|---|---|---|
| 484 + 996 | 120 MHz | 4 options |

In 80 MHz OFDMA, an aggregation of large-size RUs configured as shown in Table 2 may be supported.

TABLE 2

| RU size | Aggregate BW | Notes |
|---|---|---|
| 484 + 242 | 60 MHz | 4 options |

In 80 MHz non-OFDMA, an aggregation of large-size RUs configured as shown in 93 may be supported. In 80 MHz non-OFDMA, puncturing can be applied. For example, one of four 242 RUs may be punctured.

TABLE 3

| RU size | Aggregate BW | Notes |
| --- | --- | --- |
| 484 + 242 | 60 MHz | 4 options |

In 160 MHz non-OFDMA, an aggregation of large-size RUs configured as shown in Table 4 may be supported. In 160 MHz non-OFDMA, puncturing can be applied. For example, one of eight 242 RUs may be punctured. For another example, one of four 484 RUs may be punctured.

TABLE 4

| 80 MHz RU size | 80 MHz RU size | Aggregate BW | Notes |
| --- | --- | --- | --- |
| 484 | 996 | 120 MHZ | 4 options |
| 484 + 242 | 996 | 140 MHZ | 8 options |

In 240 MHz non-OFDMA, an aggregation of large-size RUs configured as shown in Table 5 may be supported. In 240 MHz non-OFDMA, puncturing can be applied. For example, one of six 484 RUs may be punctured. For another example, one of three 996 RUs may be punctured.

TABLE 5

| 80 MHz RU size | 80 MHz RU size | 80 MHz RU size | Aggregate BW | Notes |
| --- | --- | --- | --- | --- |
| 484 | 996 | 996 | 200 MHZ | 6 options |
| — | 996 | 996 | 160 MHz | 3 options |

In 320 MHz non-OFDMA, an aggregation of large-size RUs configured as shown in Table 6 may be supported. In 320 MHz non-OFDMA, puncturing can be applied. For example, one of eight 484 RUs may be punctured. For another example, one of four 996 RUs may be punctured.

TABLE 6

| 80 MHz RU size | 80 MHz RU size | 80 MHz RU size | 80 MHz RU size | Aggregate BW | Notes |
| --- | --- | --- | --- | --- | --- |
| 484 | 996 | 996 | 996 | 280 MHZ | 8 options |
| — | 996 | 996 | 996 | 240 MHZ | 4 options |

Hereinafter, technical features related to the operating mode will be described.

According to an embodiment, a station (STA) supporting the EHT standard STA (hereinafter, "EHT STA") or a station (STA) supporting the EHT standard STA (hereinafter, "HE STA") may operate in a 20 MHz channel width mode. In the 20 MHz channel width mode, the EHT STA may operate by reducing the operating channel width to 20 MHz using an operating mode indication (OMI).

According to an embodiment, the EHT STA (or HE STA) may operate in an 80 MHz channel width mode. For example, in the 80 MHz channel width mode, the EHT STA may operate by reducing the operating channel width to 80 MHz using an operating mode indication (OMI).

According to an embodiment, the EHT STA may support sub-channel selective transmission (SST). An STA supporting the SST can quickly select (and switch to) another channel between transmissions to cope with fading in a narrow sub-channel.

The 802.11be standard (i.e., the EHT standard) can provide a higher data rate than the 802.11ax standard. The EHT (i.e., extreme high throughput) standard can support wide bandwidth (up to 320 MHz), 16 streams, and multi-band operation.

In the EHT standard, various preamble puncturing or multiple RU allocation may be supported in wide bandwidth (up to 320 MHz) and SU/MU transmission. In addition, in the EHT standard, a signal transmission/reception method through 80 MHz segment allocation is considered in order to support an STA with low end capability (e.g., 80 MHz only operating STA). Accordingly, in the following specification, a method of configuring/transmitting an EHT-SIG for the MU transmission in consideration of sub-channel selective transmission (SST) defined in the 11ax standard and Multi-RU aggregation may be proposed. For example, the EHT-SIG may be configured as a self-contained EHT-SIG. When the self-contained EHT-SIG is used, a technical feature for signaling RU allocation may be proposed in the present specification.

EHT PPDU Configuration

In order to support a transmission method based on the EHT standard, a new frame format may be used. When transmitting a signal through the 2.4/5/6 GHz band based on the new frame format, conventional Wi-Fi receivers (or STAs) (e.g., 802.11n) as well as receivers supporting the EHT standard receivers in compliance with the 802.11n/ac/ax standard) can also receive EHT signals transmitted through the 2.4/5/6 GHz band.

The preamble of the PPDU based on the EHT standard can be set in various ways. Hereinafter, an embodiment of configuring the preamble of the PPDU based on the EHT standard will be described. Hereinafter, a PPDU based on the EHT standard may be described as an EHT PPDU. However, the EHT PPDU is not limited to the EHT standard. The EHT PPDU may include not only the 802.11be standard (i.e., the EHT standard), but also a PPDU based on a new standard that is improved/evolved/extended with the 802.11be standard.

Figure 18:
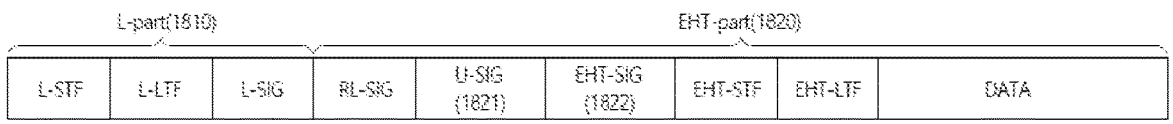
FIG. 18 shows an example of an EHT PPDU.

FIG. 18 shows an example of an EHT PPDU.

Referring to FIG. 18, an EHT PPDU 1800 may include an L-part 1810 and an EHT-part 1820. The EHT PPDU 1800 may be configured in a format to support backward compatibility. In addition, the EHT PPDU 1800 may be transmitted to a single STA and/or multiple STAs. The EHT PPDU 1800 may be an example of an MU-PPDU of the EHT standard.

The EHT PPDU 1800 may include the L-part 1810 preceding the EHT-part 1820 for coexistence or backward compatibility with a legacy STA (e.g., STA in compliance with the 802.11n/ac/ax standard). For example, the L-part 1810 may include L-STF, L-LTF, and L-SIG. For example, phase rotation may be applied to the L-part 1810.

According to an embodiment, the EHT part 1820 may include RL-SIG, U-SIG 1821, EHT-SIG 1822, EHT-STF, EHT-LTF, and data fields. Similar to the 11ax standard, RL-SIG may be included in the EHT part 1820 for L-SIG reliability and range extension. The RL-SIG may be transmitted immediately after the L-SIG, and may be configured to repeat the L-SIG.

For example, four additional subcarriers may be applied to L-SIG and RL-SIG. The extra subcarriers may be configured at subcarrier indices [−28, −27, 27, 28]. The extra subcarriers may be modulated in a BPSK scheme. In addition, coefficients of [−1−1 −1 1] may be mapped to the extra subcarriers.

For example, the EHT-LTF may be one of 1×EHT-LTF, 2×EHT-LTF, or 4×EHT-LTF. The EHT standard may support EHT-LTF for 16 spatial streams.

Each field in FIG. 18 may be the same as the corresponding field described in FIG. 13.

Hereinafter, technical features that can be further improved in the present specification will be described.

In a wireless LAN system, a 6 GHz band may be newly established. The 6 GHz band may include 20/40/80/160/320 MHz channels in the frequency domain described with reference to FIG. 12. For example, when transmitting and receiving a signal in an indoor environment through the 6 GHz band, low power transmission may have to be performed. That is, for the existing transceiver used in the 6 GHz band, the transmission power of the wireless LAN signal may be limited. As a result, when a PPDU (for example, the EHT PPDU) is transmitted/received through a 6 GHz band, a problem in that a transmission range is shortened due to the low power transmission may occur. Accordingly, the present specification proposes a transmission/reception technique for range extension. On the other hand, although the example of the present specification is preferably applied to PPDU transmission/reception in the 6 GHz band, it may be used in other bands in which a problem of a short transmission range may occur.

The present specification proposes various technical features for range extension. The various technical features proposed in the present specification are preferably applied to the transmission/reception PPDU. In other words, an example of the present specification proposes various transmission/reception PPDUs for range extension. An example of the transmitting/receiving PPDU may include various fields described in FIGS. 3, 7, 8, 13, 18, and 19.

More specifically, an example of the transmission/reception PPDU may include at least one legacy field (for example, L-STF, L-LTF, L-SIG, and RL-SIG in FIG. 18). In addition, an example of the transmission/reception PPDU includes a first control signal field (for example, U-SIG field) and a second control signal field (for example, EHT-SIG field) for the transmission/reception PPDU. For example, the first control signal field may be the U-SIG 1821 of FIG. 18, and the second control signal field may be the EHT-SIG 1822 of FIG. 18. In addition, an example of the transmitting/receiving PPDU may include an STF (for example, EHT-STF), an LTF (for example, EHT-LTF), and a data field.

Various technical features for range extension may be applied to the first control signal field (for example, U-SIG field), the second control signal field (for example, EHT-SIG field), an STF (for example, EHT-STF), an LTF (for example, EHT-LTF), and/or data field.

Hereinafter, the first control signal field (for example, U-SIG field) and the second control signal field (for example, EHT-SIG field) will be described in detail.

Control information not included in the first control signal field (for example, U-SIG field) may be referred to by various names such as overflowed information or overflow information. The second control signal field (for example, EHT-SIG field) may include a common field and a user specific field. Each of the common field and the user specific field may include at least one encoding block (for example, a binary convolutional code (BCC) encoding block). One encoding block may be transmitted/received through at least one symbol, and one encoding block is not necessarily transmitted through one symbol. Meanwhile, one symbol for transmitting the encoding block may have a symbol length of 4 µs.

The transmission/reception PPDU proposed in the present specification may be used for communication for at least one user. For example, the technical features of the present specification may be applied to an MU-PPDU (for example, EHT MU PPDU) according to the 11be standard. For example, an example of an MU-PPDU for transmitting a signal to multiple STAs in consideration of backward compatibility may be the PPDU of FIG. 18.

Figure 19:
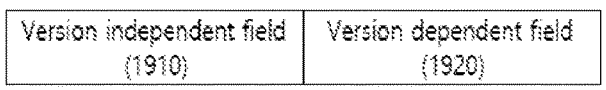
FIG. 19 shows an example of a first control signal field or U-SIG field of the present specification.

FIG. 19 shows an example of the first control signal field or the U-SIG field of the present specification.

As illustrated, the first control signal field (for example, U-SIG field) may include a version independent field 1910 and a version dependent field 1920. For example, the version independent field 1910 may include control information that is continuously included regardless of the version of the WLAN (for example, IEEE 802.11be and the next-generation standards of 11be). For example, the version dependent field 1920 may include control information dependent on a corresponding Version (for example, IEEE 802.11be standard).

For example, the version independent field 1910 may include a 3-bit version identifier indicating 11be and a Wi-Fi version after 11be, a 1-bit DL/UL field BSS color, and/or information related to TXOP duration. For example, the version dependent field 1920 may include information related to PPDU format type and/or Bandwidth, and MCS.

For example, in the first control signal field (for example, U-SIG field) shown in FIG. 19, two symbols (for example, two consecutive 4 µs-long symbols) may be jointly encoded. In addition, the field of FIG. 19 may be configured based on 52 data tones and 4 pilot tones for each 20 MHz band/channel. In addition, the field of FIG. 19 may be modulated in the same manner as the HE-SIG-A of the conventional 11ax standard. In other words, the field of FIG. 19 may be modulated based on the BPSK 1/2 code rate.

For example, the second control signal field (for example, EHT-SIG field) may be divided into a common field and a user specific field, and may be encoded based on various MCS levels. For example, the common field may include indication information related to a spatial stream used in a transmission/reception PPDU (for example, a data field) and indication information related to an RU. For example, the user specific field may include ID information used by at least one specific user (or receiving STA), MCS, and indication information related to coding. In other words, the user specific field may include decoding information for a data field (for example, STA ID information allocated to the RU, MCS information, and/or channel coding type/rate information) transmitted through at least one RU indicated by an RU allocation sub-field included in the common field.

An example of an information field/bit that may be included in the first control signal field (for example, U-SIG field) is shown in Table 7 below. As will be described below, since there is a restriction on the length of the first control signal field (for example, U-SIG field), some of the fields in Table 7 may overflow into other fields. That is, the bit lengths described in the table below may be changed, and at least one of the individual fields/bits listed in the table below may be omitted. Also, other fields/bits may be added.

TABLE 7

| Field | bits |
| --- | --- |
| PHY version Identifier | 3 |
| TXOP | 7 |
| BSS Color | 6 |
| DL/UL | 1 |
| BW | 3 |
| PPDU format | 2 |
| EHT-SIG MCS | 3 |
| Nsym of EHT-SIG/ users of MU-MIMO | 5 |
| GI + LTF | 2 |
| Coding | 1 |
| LDPC Extra symbol | 1 |
| STBC | 1 |
| Beamformed | 1 |
| Pre-FEC padding | 2 |
| PE Disambiguity | 1 |
| doppler | 1 |
| spatial reuse | 4 |
| beam change | 1 |
| DCM | 1 |
| HARQ | 1 |
| Multi-AP | 1 |
| Compression | 1 |
| CRC | 4 |
| Tail | 6 |
| Total bits | 54 |

The first control signal field (for example, U-SIG field) may consist of two consecutive symbols. In this case, the maximum number of bits that can be included in the first control signal field (for example, U-SIG field) may be fixed or preset (for example, fixed to 48/52 bits or preset). Accordingly, information that is not included in the first control signal field (for example, U-SIG field) may exist, and such information may be referred to by various names such as overflowed information, overflow information, U-SIG overflow, and U-SIG overflow information/field. According to an example of the present specification, the overflowed information is preferably included in the second control signal field (for example, EHT-SIG field). In addition, since the overflowed information may not be user specific information, the corresponding information is preferably included in the Common field of the second control signal field (for example, EHT-SIG field).

Hereinafter, examples of various technical features for range extension will be described.

Feature 1: Hereinafter, an example of a PPDU for range extension is proposed. The EHT PPDU to which technical features related to range extension are applied may be indicated by various names such as "11be ER PPDU", "EHT ER PPDU", "ER PPDU", "ER transmission signal", and "ER transmission". Also, since a duplication technique for some fields/RUs of the PPDU can be applied for range extension, the PPDU for range extension can be configured based on a duplicate transmission mode. That is, the "ER PPDU" may be indicated as a PPDU configured based on a duplication transmission mode.

The"ER PPDU" in this specification may mean PPDUs of various formats for ER transmission. The "ER PPDU" in this specification may include a signal field supporting a normal SU/MU mode (e.g., a U-SIG field for an EHT MU PPDU) or a signal field separately designed for the ER mode. Meanwhile, the technical features presented below may be equally applied to other wireless LAN standards as well as the IEEE 802.11be standard.

Features 1.a. As described above, the first control signal field (e.g., U-SIG field) may include a field (or subfield) related to the PPDU type. In this case, the field related to the PPDU-type may be configured as follows.

Characteristic 1.a.i. The PPDU type field may consist of 2-bit information. In this case, one entry of 2-bit information may indicate an extend range PPDU.

Features 1.a.i.1. For example, within the 2-bit information, a first value (e.g., 00) indicates an SU PPDU, a second value (e.g., 01) indicates an MU-PPDU, and a third value (e.g., For example, 10) may indicate a TB PPDU, and a fourth value (e.g., 11) may indicate the ER PPDU. It is also possible that only some of the many values described above are used.

Feature 1.a.i.1.a. For example, it is also possible to indicate the SU-PPDU and the MU-PPDU through one and the same entry (i.e., the first value) within the 2-bit information.

Feature 1.a.i.1.b. For example, the ER PPDU may consist of SU/MU PPDU.

Feature 1.a.ii. As another example, 3-bit information in the first control signal field (e.g., U-SIG field) may be used. For example, the 3-bit information may be composed of two consecutive subfields. For example, the 3-bit information may be configured through a first subfield for a PPDU type composed of 2 bits and a second subfield composed of 1 bit. The second subfield may include information on an HARQ operation applied to a transmission/reception PPDU (e.g., redundancy version, new data indicator, information on the HARQ processor number) and/or information on a multi-AP communication technique applied to a transmission/reception PPDU. For example, the 3-bit information may be composed of one subfield, and at least one entry (i.e., at least one predetermined value) among the one subfield may include information about the PPDU type, and another at least one entry may include information on the HARQ operation (e.g., information on the redundancy version, new data indicator, and HARQ processor number) and/or information on the multi-AP communication technique applied to the transmission and reception PPDU.

Feature 1.b. When the value of PPDU type subfield has a value pre-configured for the ER PPDU, for range extension, power boosting may be applied to the L-STF, L-LTF, L-SIG, RL-SIG, STF and/or LTF. For example, the power boosting is applied from the L-STF to the RL-SIG, or from the L-STF to a first control signal field (e.g., a U-SIG field) or to a second control signal field (e.g., up to EHT-SIG field), or from the L-STF to STF (e.g., EHT-STF) or to LTF (e.g., EHT-LTF). The power boosting may be applied by 1/2/3 dB.

Feature 1.c. In order to increase the robustness of the first control signal field (e.g., U-SIG field) including common information, the first control signal field (e.g., U-SIG field) may be repeated in the time domain. there is. For example, the first control signal field (e.g., U-SIG field) composed of 2 contiguous symbols may be repeated and composed of a total of 4 symbols.

Feature 1.c.i. Hereinafter, an example in which the symbol for the first control signal field (e.g., U-SIG field) is repeated is described.

Figure 20:
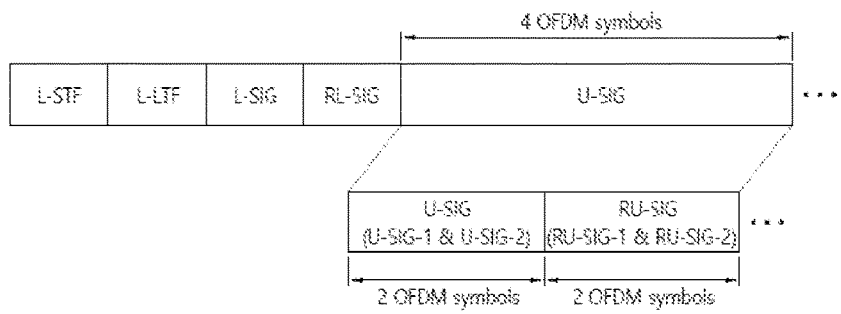
FIG. 20 is an example in which symbols for the first control signal field are repeated.

Feature 1.c.i.1. For example, the first control signal field (e.g., U-SIG field) may be repeated in units of 2 symbols. FIG. 20 is an example in which symbols for the first control signal field are repeated. As shown, the same two symbols (e.g., U-SIG-1 and U-SIG-2) contiguous to the two symbols (e.g., U-SIG-1 and U-SIG-2) for the first control signal field can be located.

Feature 1.c.i.2. For example, the first control signal field (e.g., U-SIG field) may be repeated in unit(s) of 1 symbol. FIG. 21 is another example in which symbols for the first control signal field are repeated. As shown, the first symbol (e.g., U-SIG-1) of the two symbols for the first control signal field may be repeated, and then the remaining symbols (e.g., U-SIG-2) may be repeated.

Feature 1.c.ii. When the first control signal field (e.g., U-SIG field) is repeated, additional technical features may be applied to the repeated first control signal field.

Feature 1.c.ii.1. For example, it is possible to not apply interleaving, apply a bipolar technique, or multiply a specific sequence to a symbol for the repeated first control signal field.

Feature 1.c.ii.2. For example, in the example of FIG. 20 or 21, it is possible to apply interleaving to the U-SIG-1 symbol and U-SIG-2 symbol, and not to apply interleaving to the RU-SIG-1 symbol and the RU-SGI-2 symbol.

Feature 1.c.iii. Similar to the above example, an example of repeating the second control signal field (e.g., EHT-SIG field) in the time domain will be described below.

Feature 1.c.iii.1. For example, the second control signal field (e.g., EHT-SIG field) may consist of 1 or 2 OFDM symbols. In this case, based on the example of FIG. 20, the second control signal field may be repeated in units of 2 symbols, or based on the example of FIG. 21, the second control signal field may be repeated in a unit of 1 symbol.

Figure 22:
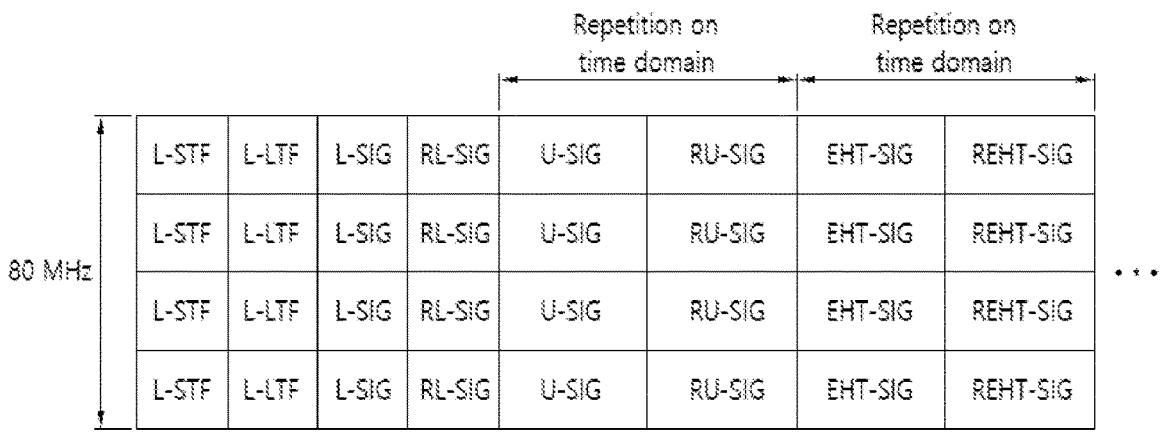
FIG. 22 shows an example of repeating the second control signal field.

Feature 1.c.iii.2. FIG. 22 shows an example of repeating the second control signal field. As shown in FIG. 22, when the second control signal field (e.g., EHT-SIG field) consists of 2 OFDM symbols, it may be repeated in the time domain.

Features 1.d. In another example, the value of the PPDU type field configured in the first control signal field (e.g., U-SIG field) has a pre-configured value for the ER PPDU, and the first control signal field (e.g., U-SIG field), an MCS level lower than that of the conventional MCS0 level (e.g., an MCS level to which DCM and BPSK techniques are applied) may be applied. In this case, the first control signal field (e.g., U-SIG field) may be composed of 4 symbols.

Feature 1.d.i. In the above example, since the ER PPDU is indicated through the PPDU type field, additional indication for robust modulation or DCM may not be required.

Feature 1.e. Similar to the first control signal field, a technique for range extension (e.g., a technique in which symbols are repeated in the time domain or DCM modulation is applied) may be applied to the symbol for the second control signal field (e.g., the EHT-SIG field).

Feature 1.c.i. In this case, whether or not the DCM technique is applied to the second control signal field (e.g., EHT-SIG field) may be indicated through the first control signal field (e.g., U-SIG field). That is, a subfield of the first control signal field (e.g., U-SIG field) may include information on whether or not the DCM technique is applied to the second control signal field.

Feature 1.f. The ER PPDU may be modified as follows.

Feature 1.f.i. The symbol for the first control signal field (e.g., U-SIG field) may be repeated in the time domain, like the above-described Feature 1.C.

Feature 1.f.ii. For example, the first control signal field may be repeated in units of 2 symbols or in units of 1 symbol, like the above-described Feature 1.C.

Feature 1.f.iii. For example, the second control signal field (e.g., EHT field) may not be repeated in the time domain but may be repeated/duplicated in the frequency domain. For example, the second control signal field (e.g., EHT field) may be duplicated in frequency based on a 20 MHz unit.

Figure 23:
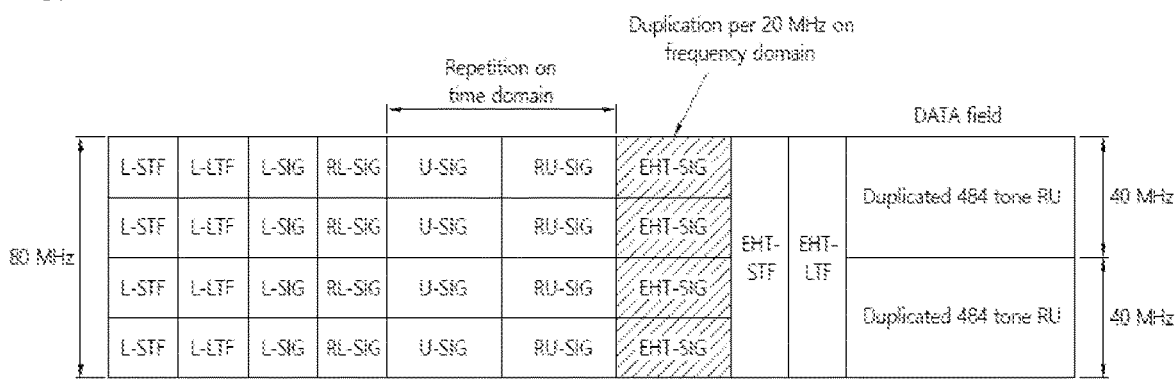
FIG. 23 is a diagram illustrating an example in which first and second control signal fields are repeated.

Feature 1.f.iv. FIG. 23 is a diagram showing an example in which the first and second control signal fields are repeated. The example of FIG. 23 relates to an 80 MHZ PPDU. As shown, the first control signal field may be repeated/duplicated in the time domain, and the second control signal field may be repeated/duplicated in the frequency domain.

Feature 1.f.iv.1. As in the example of FIG. 23, the first control signal field (i.e., U-SIG field) may be repeated/ duplicated in the time domain. For example, 2 symbols for the original first control signal field and 2 additional symbols for the repeated/duplicated signal field may be included in the ER PPDU. Meanwhile, as in the example of FIG. 23, the second control signal field (i.e., the EHT-SIG field) may not be repeated/duplicated in the time domain, but may be repeated/duplicated in the frequency band in 20 MHz segments.

Feature 1.f.iv.2. The receiving STA may confirm that the received PPDU is an ER PPDU (or an ER PPDU for SU communication) based on the repetition of the first control signal field.

Feature 1.g.ii. The following technical characteristics may be applied to the RU included in the ER PPDU of the present specification.

Feature 1.g.i. For example, 26-tone RU, 52-tone RU, 106-tone RU, 242-tone RU (or RU26, RU52, RU106, RU242, etc.) shown in FIG. 4 may be aggregated in various ways. For example, a plurality of RUs may be aggregated in various ways based on the example of FIG. 15. The RU PPDU of this specification can support various RU aggregations.

Feature 1.g.ii. For example, the size of RU usable in the ER PPDU of the present specification may be as follows.

Feature 1.g.ii.1. According to the first example, RUs of any size can be used for the ER PPDU in this specification. For example, RU26, RU52, RU26+RU52 (that is, RU in which 26-tone RU and 52-tone RU are aggregated), RU106, RU106+RU26, and RU242 may all be used.

Feature 1.g.ii.1.a. For example, it is possible to apply any one of available RU sizes (e.g., the above-mentioned 6 sizes) to a specific ER PPDU. That is, the data field of one specific ER PPDU may consist of RUs of any one size.

Feature 1.g.ii.2. According to the second example, only RUs having a size of 106-tone or more can be used for the ER PPDU.

Feature 1.g.ii.2.a. For example, for one specific ER PPDU, one of three RU sizes (e.g., RU106, RU106+RU26, RU242) may be selected.

Feature 1.g.ii.2.b. According to another example, only RU106 and RU242 to which RU aggregation is not applied may be used for the ER PPDU of the present specification.

Feature 1.g.ii.3. When transmitting the ER PPDU, information on the size of an available RU for data transmission of the ER PPDU includes the first/second control signal fields (i.e., U-SIG and/or EHT-SIG).

Feature 1.g.ii.3.a. For example, information on the size of available RU for data transmission of ER PPDU may be included in the ER allocation field, and the ER allocation field may be included in the first/second control signal field. The ER allocation field may consist of 1 bit or 2 bits and may be called various names. The following is an example of the ER allocation field. For example, when the ER allocation field has a first value (i.e., 00), only 106-tone RU can be used for the data signal/field of the ER PPDU.

TABLE 8

| 2 bit indices | RU size |
|---|---|
| 00 | 106 |
| 01 | 106 + 26 |

TABLE 8-continued

| 2 bit indices | RU size |
| --- | --- |
| 10 | 242 |
| 11 | Reserved |

Feature 1.g.iii. As described above, when a data signal/field of an ER PPDU is transmitted using an RU of a specific size, the following technical features may be additionally applied.

Feature 1.g.iii.1. For example, a fixed RU with power boosting technique described below may be used.

Feature 1.g.iii.1.a. For example, upon transmission of the ER PPDU, a location of an available RU may be pre-configured based on an RU size used within a 20 MHz band (e.g., an RU size indicated by the ER allocation field). For example, when RU106 is used, the leftmost RU106 may be used. For example, when RU106+RU26 is used, RU106 located at the leftmost position and RU26 located fifth from the leftmost position may be used. The location of the pre-configured RU (i.e., RU106 or RU106+RU26) may be changed.

Feature 1.g.iii.1.b. In the above example, since the location of the RU is fixed (or pre-configured), additional indication or signaling for the location of the RU may be omitted.

Feature 1.g.iii.1.c. For a signal transmitted using a fixed RU location, power boosting may be applied in consideration of a corresponding RU size within a 20 MHz band.

Feature 1.g.iii.2. For example, the repetition within 20 MHz technique described below may be used.

Feature 1.g.iii.2.a. For example, when the RU size (e.g., RU size indicated by the ER allocation field) used below for the ER PPDU is determined, the corresponding RU may be repeated within a specific band (e.g., 20 MHz band). For example, when a 106-tone RU is used for the ER PPDU (i.e., when a 106-tone RU is indicated by the ER allocation field), two 106-tone RUs can be allocated within 20 MHz. Accordingly, the 106-tone RU may be duplicated/repeated in frequency within the 20 MHz band.

Feature 1.g.iii.2.b. According to the above example, since the same data is repeated/duplicated in an RU of the same size, there is an advantage in that diversity and repetition gain are generated.

Feature 1.g.iv. Additionally or alternatively, when configuring the ER PPDU, it is possible to repeat the data signal in units of 20 MHZ.

Feature 1.g.iv.1. Since wide bandwidth transmission can be considered in a specific band (e.g., 6 GHz band), the ER PPDU can also be transmitted through a wide bandwidth. For example, when an ER PPDU is transmitted within a wide bandwidth, data (e.g., user data or payload) may be allocated to 242 tone RU. In this case, the 242 tone RU may be repeated/duplicated within BW.

Feature 1.g.iv.2. Hereinafter, an example in which an 80 MHz ER PPDU is used will be described.

Figure 24:
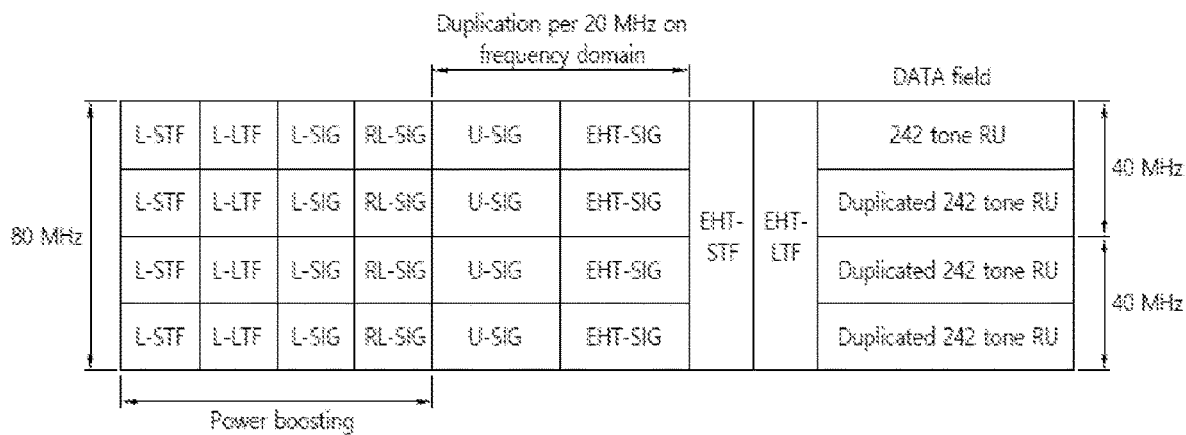
FIG. 24 shows an example in which data fields are repeated for wide bandwidth transmission.

Feature 1.g.iv.2.a. FIG. 24 shows an example in which data fields are repeated for wide bandwidth transmission. As shown, 242-tone RUs are repeated/duplicated, so that a total of four identical 242-tone RUs can be transmitted.

Feature 1.g.iv.2.b. In the above example, DCM for the data field may be applied. For example, the 242-tone RU of FIG. 24 may be an RU to which DCM is applied.

Features 1.g.iv.2.c. In the above example, the STF and LTF (i.e., EHT-STF and EHT-LTF) may be configured using a sequence corresponding to the full bandwidth. For example, as shown in FIG. 24, when repetition/duplication is applied to the data field of an 80 MHz PPDU, it is preferable to use an EHT-STF sequence and an EHT-LTF sequence preconfigured/predefined for 80 MHz.

Feature 1.g.iv.2.d. According to another example, it is possible to set the STF and LTF sequences based on 20 MHz. That is, it is possible to use the EHT-STF sequence and the EHT-LTF sequence preconfigured/predefined for the 20 MHz band.

Feature 1.g.iv.2.c. If data fields are duplicated/repeated, the problem of increasing PAPR may occur. To reduce PAPR, phase rotation can be applied to the 20 MHz frequency segment. That is, phase rotation may be applied to the data field. For example, each element of the phase rotation sequence for phase rotation may be selected as one of {1, −1, j, −j}.

Feature 1.g.iv.2.c.i. For example, a phase rotation sequence of [1−1 −1−1] may be applied to the data field of the 80 MHz ER PPDU.

Feature 1.g.iv.2.c.ii. For example, for the data field of a 160 MHz ER PPDU, a phase rotation sequence of [1−1 −1 −1 1 −1 −1 −1] can be applied.

Feature 1.g.iv.2.c.iii. The phase rotation operation described above can be applied to STF/LTF of the ER PPDU. Specifically, when the STF/LTF of the ER PPDU is duplicated in the same way as the data field, phase rotation for the data field may be equally applied to the STF/LTF.

Feature 1.g.v. The size of the RU, the number of repeated/duplicated RUs, and the bandwidth of the PPDU used in the above example can be modified. For example, the data field may be repeated/duplicated in units of 20/40/80/160 MHz. That is, RUs having various tones (e.g., 242/484/996/2×996) may be duplicated/repeated for the data field of the ER PPDU.

Feature 1.g.v.1. For example, if the total bandwidth of the ER PPDU is N, the size of one RU included in the data field of the ER PPDU is set based on N/2, and the corresponding RU is preferably duplicated/repeated in frequency. The bandwidth may be variously set to 80/160/320 MHz, etc., and the size of one RU may also be variously set to 484/996/2×996-tone RU or the like.

Feature 1.g.v.1.a. For example, when configuring a 40 MHz ER PPDU, one RU for a data field may be set based on a 20 MHz bandwidth. That is, it is preferable that the 242-tone RU corresponding to the 20 MHz bandwidth is included in the data field and duplicated/repeated in frequency. For example, when configuring an 80 MHz ER PPDU, one RU for a data field may be set based on a 40 MHz bandwidth. That is, it is preferable that the 484-tone RU corresponding to the 40 MHz bandwidth is included in the data field and duplicated/repeated in frequency.

Feature 1.g.v.1.b. When one RU is duplicated/repeated as described above, reception performance can be improved by 3 dB. Through this, the effect of extending the transmission/reception range can be obtained.

Feature 1.g.v.1.c. As above, when the RU included in the data field is repeated/duplicated, STF/LTF (e.g., EHT-STF/EHT-LTF) is preferably set based on the total bandwidth of the ER PPDU. For example, when an 80 MHz ER PPDU is configured, a 484-tone RU rather than a 996-tone RU is used for the data field, but an 80 MHz bandwidth sequence is preferably used for STF/LTF rather than a 40 MHz bandwidth. In other words, the STF/LTF is preferably configured based on a predefined/preconfigured STF/LTF sequence (e.g., 80 MHZ EHT-STF/LTF sequence) for the total bandwidth of the PPDU (e.g., 80 MHZ).

In addition, when a 160 MHz ER PPDU is configured, a 996-tone RU rather than a 2*996-tone RU is used for the data field, but a sequence of 160 MHz bandwidth rather than 80 MHz bandwidth is preferably used for STF/LTF. In other words, the STF/LTF is preferably configured based on a predefined/preconfigured STF/LTF sequence (e.g., 160 MHz EHT-STF/LTF sequence) for the total bandwidth of the PPDU (e.g., 160 MHZ).

In addition, when a 320 MHz ER PPDU is configured, the data field uses 2*996-tone RU rather than 4*996-tone RU, but STF/LTF preferably uses a sequence of 320 MHZ bandwidth rather than 160 MHz bandwidth. In other words, the STF/LTF is preferably configured based on a predefined/preconfigured STF/LTF sequence (e.g., 320 MHz EHT-STF/LTF sequence) for the total bandwidth of the PPDU (e.g., 320 MHZ).

Figure 25:
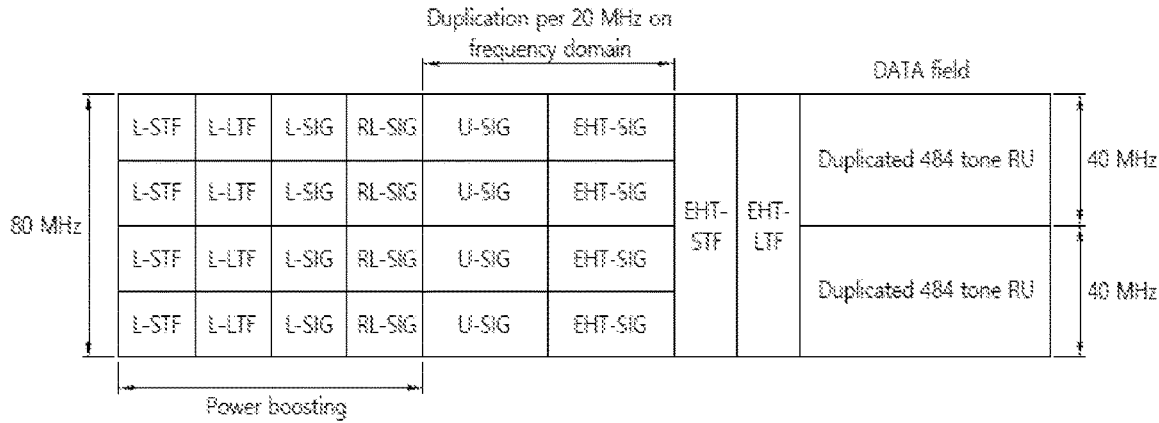
FIG. 25 is an example of an ER PPDU including an STF/LTF field configured based on the total bandwidth.

FIG. 25 is an example of an ER PPDU including an STF/LTF field configured based on the total bandwidth. As shown, the total bandwidth of the ER PPDU is 80 MHZ, and accordingly, a 484-tone RU is included in the data field, and the 484-tone RU is duplicated in frequency. That is, an RU corresponding to half of the total bandwidth (i.e., 40 MHZ) is allocated to the data field. However, STF/LTF is configured based on a preset STF/LTF sequence for the total bandwidth, that is, an 80 MHZ EHT-STF/LTF sequence.

Feature 1.g.v.1.d. Additionally or alternatively, when the RU included in the data field is repeated/duplicated, the STF/LTF (e.g., EHT-STF/EHT-LTF) may be also repeated/duplicated in the same way as the RU. For example, when configuring an 80 MHZ ER PPDU, STF and LTF may be set based on a sequence predefined/preconfigured for a 40 MHz bandwidth. Corresponding STF/LTF can be duplicated in frequency.

When STF/LTF is duplicated in the same way as RU, the following problems may occur. For example, if the total bandwidth of the ER PPDU is 80 MHz and the STF/LTF is based on a 20/40 MHz sequence, additional indication/signaling may be required regarding that the STF/LTF has been generated and repeated based on some bandwidth rather than total bandwidth. Also, there is a possibility that the tone allocation (or RU location) related to the total bandwidth is not exactly aligned with the tone allocation (or RU allocation) related to some bandwidth. For example, since the 80/160/320 MHz tone allocation defined in a wireless LAN system does not exactly match the 20 MHz tone allocation, when a 20 MHZ STF/LTF sequence is used while transmitting an 80/160/320 MHz ER PPDU, the performance of channel estimation for some tones may deteriorate. Accordingly, as shown in FIG. 25, it is preferable to generate STF/LTF based on the total bandwidth.

Feature 1.g.v.1.d.i. In order to reduce the PAPR problem increased by duplication of RU, it is preferable to apply phase rotation. For example, phase rotation may be applied to a data field, STF, and/or LTF. Phase rotation operation may be applied in units of duplicated BW/RU.

Feature 1.g.v.1.d.ii. For example, in case of duplication in 40 MHz units (or 80 MHZ units) for 80 MHz (or 160 MHZ) ER PPDUs, phase rotation may be performed in units of 40 MHz (or units of 80 MHz). In this case, the phase rotation sequence may be [1 j], [1 −1], [−1 1], [1 −j], or the like.

Feature 1.g.v.1.c. For example, the transmission format (or duplication format) of the ER PPDU may be indicated through a subfield of the U-SIG field. For example, it may be indicated through a BW field in the U-SIG field and/or a PPDU-type field. For example, when an 80 MHz ER PPDU is transmitted, the BW field may have a value predefined/preconfigured for 80 MHz, and the PPDU-type field may have a value preset for Extended Range format (or duplication format) (e.g., 11). The receiving STA can know that the received PPDU is an 80 MHz signal through the BW field of the received PPDU, and the received PPDU is an ER PPDU (i.e., ER PPDU in which 484-tone RU corresponding to 40 MHz is duplicated in frequency) through the type field.

Feature 1.g.v.2. The above-described specific RU size, bandwidth, etc. may be modified. That is, various repetition granularity (or duplication granularity) may be considered for the ER PPDU.

Feature 1.g.v.2.a. For example, a 20/40/80/160 MHz sub-channel or 242/484/996/2×996-tone may be considered for repetition granularity.

Feature 1.g.v.2.b. When various repetition granularity is supported, additional information to indicate the granularity may be required. For example, information on repetition granularity may be indicated through the following 2-bit information. The following 2-bit information may be included in the first control signal field (e.g., U-SIG field) or the second control signal field (e.g., EHT-SIG field).

TABLE 9

| 2 bit indication for size of duplication | RU size |
| --- | --- |
| 00 | 20 MHz (i.e., 242) |
| 01 | 40 MHz (i.e., 484) |
| 10 | 80 MHz (i.e., 996) |
| 11 | 160 MHz (i.e., 2 × 996) |

For example, when the 2-bit information has a first value (e.g., 00), the RU of the ER PPDU may be repeated/duplicated in 20 MHz units (or 242-tone units). For example, when repeated/duplicated in 20 MHz units (or 242-tone units) as in the example of FIG. 25, that is, when the repetition granularity is 40 MHz (or 484-tone), the second bit information has a second value (e.g., 01).

Feature 1.g.v.2.c. The 2-bit information may be configured by reusing an existing field in the first/second control signal fields or defining a new entry in the existing field. For example, the following method can be considered.

Feature 1.g.v.2.c.i. For robust transmission of the ER PPDU, an MCS scheme based on a low MCS level is preferably applied to the ER PPDU. For example, only BPSK and QPSK modulation can be applied to the data field of the ER PPDU, and accordingly, only low MCS levels (e.g., conventional MCS0, MCS1, and MCS2 levels) can be considered. For example, when the MCS field consists of 4 bits (b0, b1, b2, b3), MSB 2 bits (i.e., b0, b1) include information on duplication/repetition granularity, and LSB 2 bits (i.e., b2, b3) may include information about the MCS. That is, since a limited number of modulation schemes such as low MCS levels are used, it is possible to indicate MCS information through only 2 bits of the LSB. The length of the MCS field may be changed and may be included in the first/second control signal fields.

Feature 1.g.v.2.c.ii. For another example, only MCS0 can be used fixedly for the data field of the ER PPDU. In this case, the MCS field may be used to indicate duplication/repetition granularity. Also, only some entries of MCS field values may include information related to duplication/repetition granularity. For example, the PPDU type field includes a predefined/preconfigured value indicating an ER PPDU, and some entries (e.g., 0: 20 MHz, 1: 40 MHz, 2: 80 MHz, 3: 160 MHz, 4 ~15: reserved) may include information related to duplication/repetition granularity.

Feature 1.g.v.2.c.iii. For example, spatial stream (SS) for transmission of ER PPDU may be fixed to 1 and used. Information on the number of SSs (i.e., NSTS or Number of Space Time Streams) may be included in the first/second control signal fields. Accordingly, subfields related to conventional NSTS may be used to indicate duplication/repetition granularity. Accordingly, the NSTS subfield included in the first/second control signal fields indicates duplication/repetition granularity when transmitting an ER PPDU, and when transmitting a PPDU of a type other than the ER PPDU, it includes information related to the number of SSs.

Feature 1.g.v.2.c.iii.1. For example, when an ER PPDU is transmitted, the subfield containing NSTS information is set to a duplication/repetition granularity (0: 20 MHz, 1: 40 MHz, 2: 80 MHz, 3: 160 MHz, 4~15: reserved).

Feature 1.g.v.3. In order to reduce signaling overhead related to duplication unit (i.e., duplicated RU) and/or ER PPDU as described above, duplication BW/RU used for ER PPDU may be fixed to one.

Feature 1.g.v.3.a. For example, in order to guarantee a minimum data rate, the size of the duplicated unit may be 20/40/80 MHz.

Feature 1.g.v.3.b. For example, when an ER PPDU is transmitted through a wide bandwidth, the duplicated unit included in the corresponding PPDU may be repeated/duplicated in frequency. For example, if a RU corresponding to 40 MHz (i.e., a 484-tone RU) is included in a PPDU having a total bandwidth of 80/160/320 MHz, the corresponding RU may be repeated/duplicated 2/4/8 times in units of 40 MHz.

Feature 1.g.v.3.c. In the above case, the STF and LTF included in the PPDU are not determined by the size of one RU, but can be set based on the STF/LTF sequence predefined/preconfigured for the total bandwidth of the PPDU.

Feature 1.g.v.3.d. Unlike the above, STF and LTF can also be repeatedly transmitted in units of duplicated units. For example, in case of duplication in units of 40 MHz, the STF and LTF are composed of 40 MHz sequences and are repeatedly transmitted within BW.

Feature 1.g.v.4. For example, in the IEEE 802.11be system, 80 MHz transmission can be a main unit. Accordingly, the ER PPDU may be applied only to 80 MHz BW. In this case, the data field included in the corresponding ER PPDU is duplicated/repeated in frequency in units of 20/40 MHz, and as a result, the same data field may be included 4/2 times.

Feature 1.g.v.4.a. Even when a PPDU having a bandwidth of 80 MHz is used as above, as described above, the EHT-STF included in the PPDU is configured based on the 80 MHz STF sequence, and the ETH-LTF is preferably configured based on an 80 MHz LTF sequence.

Feature 1.g.v.4.b. Alternatively, it is possible to repeat STF/LTF in the same way as the data field to obtain a combine gain for STF and LTF. That is, in order to configure STF/LTF, an STF/LTF signal may be generated based on a 20/40 MHz sequence and duplicated 4/2 times in frequency.

Feature 1.g.v.4.c. For example, PAPR may increase when a specific unit (e.g., data RU, STF, LTF) is repeated/duplicated in frequency. To solve this problem, when a specific unit is repeated/duplicated in units of 20/40 MHz, a specific phase rotation sequence may be applied to the duplicated/repeated unit. For example, [1 −1 −1 −1] can be applied to units duplicated/repeated in units of 20 MHZ, and [1 j] can be applied to units duplicated/repeated in units of 40 MHz.

Feature 1.g.v.4.d. In the above example, when a specific unit is duplicated/repeated in units of 20 MHz, signal transmission based on duplicated/repetition may be possible only for the primary 40 MHz band/channel for power boosting.

Figure 26:
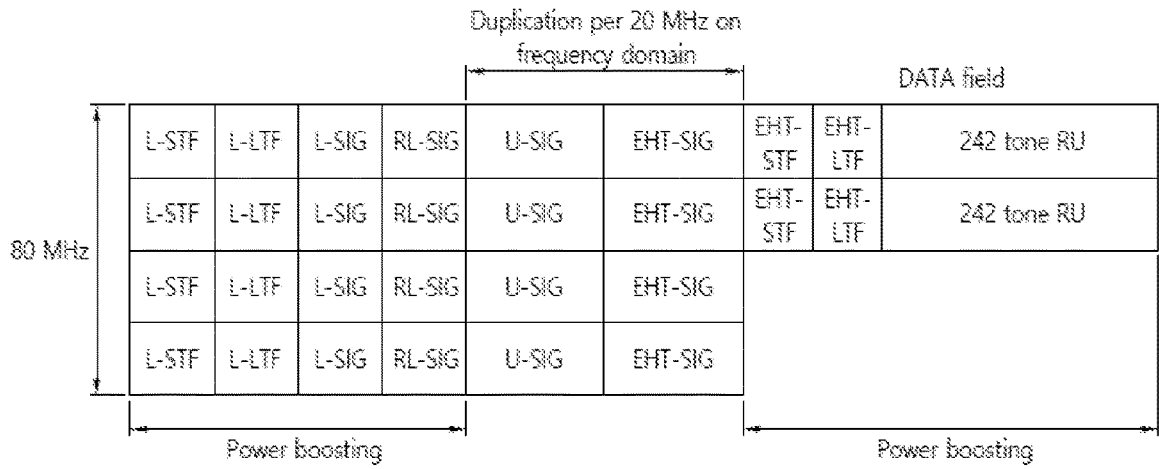
FIG. 26 shows an example of a PPDU in which duplication/repetition is performed only for a specific unit.

Feature 1.g.v.4.c. FIG. 26 shows an example of a PPDU in which duplication/repetition is performed only for a specific unit. As shown, a specific unit (i.e., data RU, STF, LTF) may be duplicated/repeated in frequency in units of 20 MHz. In this case, as shown, a corresponding unit is transmitted only for a primary 40 MHz band/channel, and power boosting may be applied to the transmitted unit. Power boosting for the unit may be performed by N dB (e.g., 1/2/3 dB).

Feature 1.g.v.5. The above example can be modified in various ways. For example, the PPDU may be configured based on only the primary 20 MHz band/channel instead of the primary 40 MHz band/channel.

Figure 27:
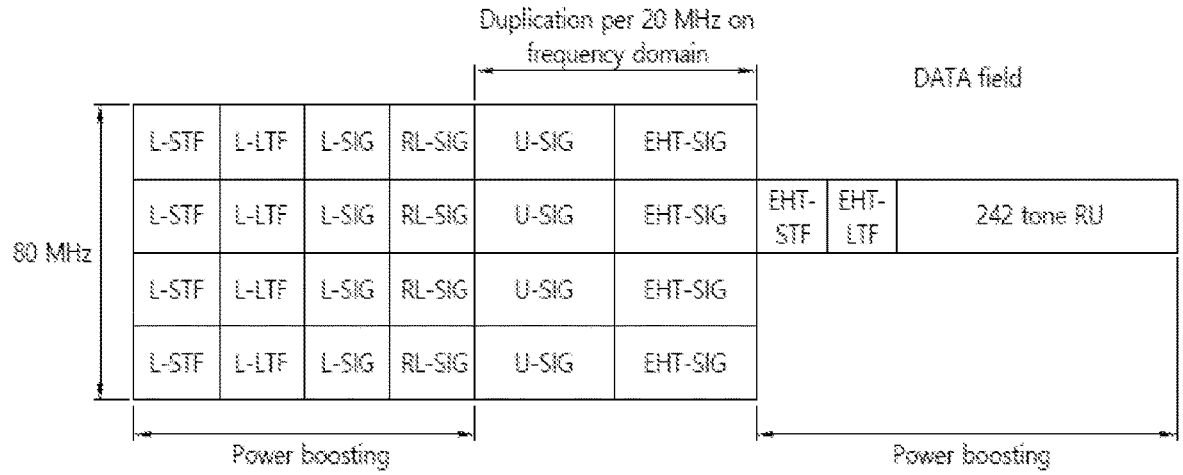
FIG. 27 shows an example of configuring a PPDU based on a specific frequency band/channel.

Feature 1.g.v.5.a. FIG. 27 shows an example of configuring a PPDU based on a specific frequency band/channel. As shown, the STF/LTF/data-field can be configured only for a specific frequency band/channel (i.e., Primary 20 MHz band/channel), and power boosting is applied to the STF/LTF/data-field (e.g., For example, power boosting based on N dB) may be performed.

Feature 1.g.v.5.b. As described above, the DCM technique may be applied to the data field of the PPDU according to the present specification. Accordingly, the 242-tone RU of FIG. 26/FIG. 27 may be an RU to which the DCM technique is applied.

Various technical features described above may be combined with technical features described below.

Feature 2. The ER PPDU of this specification can be applied only to the primary 80 MHz region/channel. For example, an ER PPDU is transmitted only in an 80 MHZ region/channel, and the PPDU includes duplicated/repeated RUs, but some fields (e.g., STF/LTF/data-fields) may not be omitted. In other words, preamble puncturing may not be supported for the ER PPDU of this specification. In other words, full bandwidth transmission may be considered for the ER PPDU of this specification.

Feature 2.a. Additionally or alternatively, some fields (e.g., STF/LTF/data-fields) in the ER PPDU may be repeated/duplicated in units of 80 MHz. For example, some fields (e.g., STF/LTF/data-fields) of the 160 MHz ER PPDU may be duplicated in units of 80 MHz to include a total of two data fields, and some fields of the 320 MHz ER PPDU (e.g., STF/LTF/data-field) may be duplicated in units of 80 MHz to include a total of 4 data fields.

Feature 3. A low MCS level (e.g., MCS0) and one spatial stream may be applied to the ER PPDU (e.g., data field) of the present specification.

Feature 3.4. As described above, repetition granularity (or duplication granularity) can be determined in various ways, and when 20 MHz granularity is used, 242-RU tones can be used in the data-field. When 40/80/160 MHz granularity is used, 484/996/2×996-tone RUs can be used within the data-field.

Feature 3.5. For the above-described extended range transmission, that is, transmission of the ER PPDU, the BSS can be configured as an extended range BSS. For the ER BSS configuration, the EHT-beacon or 11be beacon conforming to the EHT standard may be repeated/duplicated in frequency as described above. The repeated/duplicated PPDU format can be configured using the EHT frame format (i.e., 11be frame format).

According to an example of the present specification, the STA may perform the following operation.

FIG. 28 is a procedure flow diagram illustrating operations performed on a transmitting STA. A transmitting STA performing the operation of FIG. 28 may be an AP STA or a non-AP STA.

The transmitting STA may configure the above-described PPDU for ER transmission (S2810). A PPDU for ER transmission may be the above-described ER PPDU. As described above, the ER PPDU may be called various names, and may also be called a PPDU related to a duplicate transmission mode or EHT duplicate transmission.

The transmitting STA constructs a transmitting/transmission PPDU (e.g., the above-described ER PPDU) according to an example of the present specification. The transmission PPDU may include a first control signal field for interpreting the transmission PPDU, a short training field (STF), a long training field (LTF), and a data field. For example, the first control signal field may be the U-SIG field, and the second control signal field may be the EHT SIG field.

For example, the first control signal field may be a U-SIG field of the EHT MU PPDU. The U-SIG field consists of two symbols (i.e., U-SIG-1 and U-SIG-2), and the first symbol (U-SIG-1) includes a total of 26 bits consisting of B0 bit to B25 bit. On the first symbol (U-SIG-1), bits B0 to B2 are configured as a PHY Version Identifier and may include information about the PHY version of the transmission PPDU, bits B3 to B5 may include bandwidth information, and bit B6 may include an UL/DL indicator, bits B7 to B12 may include BSS identification information for the transmission PPDU, bits B13 to B19 may include duration information of TXOP related to the transmission PPDU, and the duration of the TXOP may be used for NAV setting for another STA. Also, bits B20 to B25 may be used for functions defined later. In addition, within the second symbol (U-SIG-2), bits B0 to B1 may include information on PPDU type and/or compression mode, and bit B2 may be used for a function defined later, bits B3 to B7 may include information about a punctured channel, bits B8 may be used for functions defined later, and bits B9 to B10 apply to the second control signal field (e.g., the EHT SIG field) may include MCS information, bits B11 to B15 may include information related to the number of symbols for transmitting the second control signal field, and bits B16 to B19 may include CRC (that is, CRC calculated based on a total of 26 bits of U-SIG-1 and bits B0 to B15 of U-SIG-2), and bits B20 to B25 may include Tail bits for BCC coding.

Additionally, or alternatively, the first control signal field may be a U-SIG field based on the ER preamble. The U-SIG field based on the ER preamble may include all or part of the U-SIG field of the EHT MU PPDU.

The U-SIG field of the EHT MU PPDU is transmitted through a total of 2 symbols (e.g., two 4 us symbols), and each symbol may be configured based on BPSK constellation mapping. In contrast, the U-SIG field of the ER preamble is transmitted through a total of 4 symbols (e.g., four 4 us symbols), and U-SIG-1 is transmitted through 2 symbols (1/2 of the total 4 symbols) symbol), and U-SIG-2 may also be repeatedly transmitted through two symbols (third/fourth symbols out of a total of four symbols). In this case, BPSK constellation mapping is applied to the 1st/3rd/4th symbols out of a total of 4 symbols, and QBPSK constellation mapping (i.e., mapping that rotates 90 degrees counterclockwise with respect to BPSK) can be applied to the 2nd symbol out of a total of 4 symbols.

For example, the first control signal field (i.e., the U-SIG field) may include a type field including a type value related to the duplicate transmission mode. For example, the type field may be B0 to B1 bits of the U-SIG-2. The receiving STA may know that the ER PPDU is received through the type field (i.e., that the transmitting STA transmits the PPDU based on the duplicate transmission mode). Meanwhile, the type field is only an example of a signaling technique for indicating the ER PPDU, and it is possible to indicate the ER PPDU in a method other than the type field.

More specifically, when the B6 bit (i.e., the UL/DL indicator) of the U-SIG-1 has a preconfigured/predefined value (e.g., '0') for DL, and B0 to B1 bits (i.e., the above-described PPDU type field) of the U-SIG-2 have a specific first value (e.g., '1'), it may be indicated that the corresponding PPDU is used for a single user (SU) or for a null data packet (NDP). In addition, when the ER PPDU is transmitted (i.e., when duplicate transmission mode is used), the B0 to B1 bits of the U-SIG-2 (i.e., the above-described PPDU type field) are set to the first value (e.g., '1'). As a result, as described above, one entry of the PPDU type field can be used for the ER PPDU.

When the B0 to B1 bits (i.e., the PPDU type field described above) of the U-SIG-2 have the first value (e.g., '1'), the second control signal field (i.e., the EHT-SIG field) may not include a sub-field for RU allocation.

On the other hand, when the transmission/reception PPDU is used for DL OFDMA communication rather than the ER PPDU, the B0 to B1 bits of the U-SIG-2 (i.e., the above-described PPDU type field) may have a second value (e.g., '0'). In this case, the second control signal field (i.e., the EHT-SIG field) may include a sub-field for RU allocation.

On the other hand, when the transmission/reception PPDU is used for DL MU-MIMO (i.e., non-OFDMA) communication rather than the ER PPDU, the B0 to B1 bits of the U-SIG-2 (i.e., the above-mentioned PPDU type field) may have a third value (e.g., '2'). In this case, the second control signal field (i.e., the EHT-SIG field) may not include a sub-field for RU allocation.

The first control signal field (i.e., the U-SIG field) may be duplicated per 20 MHz in frequency, as in the example of FIG. 24.

When the ER PPDU of this specification is transmitted, the second control signal field (i.e., EHT-SIG field) may be transmitted based on the EHT-SIG content channel. One EHT-SIG content channel can occupy a 20 MHz band. In addition, as in the example of FIG. 24, one EHT-SIG content channel may be duplicated per 20 MHz on frequency. For example, one EHT-SIG content channel may include a common field and a user specific field. The common field may include the overflowed information, and may include, for example, additional control information (e.g., information about the number of receiving STAs). The user specific field may include control information for a receiving STA receiving an ER PPDU.

The data field may include a first data RU including a tone for half of the total bandwidth of the transmission PPDU and a second data RU in which the first data RU is duplicated in frequency. For example, when an 80 MHz PPDU is transmitted as shown in FIG. 25, the first data RU may be a 484-tone RU. Also, when a 160 MHz PPDU is transmitted, the first data RU may be a 996-tone RU. Also, when a 320 MHz PPDU is transmitted, the first data RU may be a 2*996-tone RU. That is, when the total bandwidth is 80 MHz, the data RU including half tones of the 80 MHz band may be a 484-tone RU. Also, when the total bandwidth is 160 MHz, the data RU including half tones of the 160 MHz band may be 996-tone RU. Also, when the total bandwidth is 320 MHZ, the data RU including half tones of the 320 MHz band may be 2*996-tone RU.

For example, partial phase rotation for PAPR reduction may be applied to the duplicated second data RU. For example, it is possible that −1 is multiplied for the first half of the tones of the second data RU and +1 is multiplied for the next half tones. In other words, [−1 1] based phase rotation may be applied to the duplicated second data RU.

Preferably, a low-level MCS technique is applied to each of the first and second data RUs. For example, each of the first and second data RUs may be modulated based on a BPSK technique. In addition, it is preferable that a dual carrier modulation (DCM) technique is applied to each of the first and second data RUs. That is, since DCM, BPSK, and frequency duplication are all applied to the data RU included in the ER PPDU of this specification, more robust transmission can be supported compared to the prior art. Also, LDPC coding may be applied to each of the first and second data RUs. In addition, each of the first and second data RUs may be transmitted through one spatial stream.

Information about MCS, coding, number of streams, etc. applied to each of the first and second data RUs may be included in the user field of the above-described user specific field. The user field may include various control bits. For example, in the user field, B0 to B10 bits may include identification information about the receiving STA of the ER PPDU, and B11 to B14 bits may be set to a preset value to indicate BSPK and DCM applied to the ER PPDU and B16 to B19 bits may include information on the number of spatial streams applied to the ER PPDU (i.e., a preset value for indicating one stream), and the B20 bit may include information related to beamforming applied to the ER PPDU, and the B21 bit may include a preset value for indicating LDPC coding applied to the ER PPDU.

The STF may be configured based on a preset STF sequence for the total bandwidth of the PPDU. For example, when the total bandwidth of the ER PPDU is 80 MHZ, the STF may be configured based on a preconfigured/predefined STF sequence for the 80 MHZ bandwidth. That is, the coefficient of the STF sequence for the 80 MHz bandwidth exists every 16 subcarriers from subcarrier index −496 to subcarrier index 496, and STF Sequence_(−496:16:496) ={M, 1, −M, 0, −M, 1, −M}*(1+j)/SQRT (2). For example, the M sequence may be defined as {−1, −1, −1, 1, 1, 1, −1, 1, 1, −1, 1, 1, −1, 1}. Also, when the total bandwidth of the ER PPDU is 160/320 MHZ, the STF may be configured based on a preconfigured/predefined STF sequence for the 160/320 MHz bandwidth.

The LTF may also be configured based on an LTF sequence preconfigured/predefined for the total bandwidth of the PPDU. For example, when the total bandwidth of the ER PPDU is 80 MHz, the LTF may be configured based on an LTF sequence preconfigured/predefined for the 80 MHz bandwidth. Also, when the total bandwidth of the ER PPDU is 160/320 MHZ, the LTF may be configured based on an LTF sequence preconfigured/predefined for the 160/320 MHz bandwidth.

The transmitting STA may transmit the PPDU constructed according to the above method through the 6 GHz band (S2820). The PPDU may be transmitted through a full band without preamble puncturing.

The operation of FIG. 28 may be performed by the device of FIGS. 1 and/or 14. For example, the transmitting STA may be implemented as the device of FIGS. 1 and/or 14. The processor of FIGS. 1 and/or 14 may perform the above-described operation of FIG. 28. Also, the transceiver of FIGS. 1 and/or 14 may perform the operation described in FIG. 28. In addition, the device proposed in this specification does not necessarily include a transceiver, and may be implemented in a chip form including a processor and a memory. Such a device may generate/store a transmission PPDU according to the example described above. Such a device may be connected to a separately manufactured transceiver to support actual transmission and reception.

FIG. 29 is a procedure flow diagram illustrating operations performed in a receiving STA. The operation of FIG. 29 may be performed by a user STA or an AP STA.

As shown, the receiving STA may receive a reception/ receiving PPDU (physical protocol data unit) (S2910). The reception PPDU means a PPDU configured for the ER transmission, the EP PPDU, or a PPDU configured based on the duplicate transmission mode.

The receiving STA may decode a reception physical protocol data unit (PPDU) based on the first control signal field (and/or the second control signal field). (S2920). For example, as described above, the first control signal field includes various pieces of information about the version of the PPDU, the bandwidth of the PPDU, the type of the PPDU, and the second control signal field. The receiving STA may start decoding the received PPDU based on the information of the first control signal field. Additionally, the receiving STA decodes the second control signal field based on various information (e.g., MCS information on the data field, etc.) included in the second control signal field, and based on this, it can further decode user data included in the data field.

This specification proposes a computer readable medium implemented in various forms. A computer readable medium according to the present specification may be encoded as at least one computer program including instructions. Instructions stored in the medium may control the processor described in FIGS. 1 and/or 14 and the like. That is, the instructions stored in the medium control the processor presented in this specification to perform the above-described operations of the transmitting/receiving STA (e.g., FIGS. 28 to 29).

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

What is claimed is:

1. A method performed in a wireless local area network (LAN), the method comprising:
    generating an extremely high throughput (EHT) physical protocol data unit (PPDU) based on a duplicate transmission mode,
    wherein the EHT PPDU includes a universal signal (U-SIG) field for interpreting the EHT PPDU, an EHT signal (EHT-SIG) field being contiguous to the U-SIG field, a short training field (STF) being contiguous to the EHT-SIG field, a long training field (LTF) being contiguous to the STF, and a data field being contiguous to the LTF;
    wherein the U-SIG field has a length of 2 symbols,
    wherein the U-SIG field includes a type field having a length of 2 bits, and a value of the type field is related to the duplicate transmission mode,
    wherein the EHT PPDU is an 80 MHZ EHT PPDU, the U-SIG field is duplicated over each 20 MHz subchannel in the 80 MHz EHT PPDU, and the EHT-SIG field includes a content channel which is duplicated over each 20 MHz subchannel in the 80 MHz EHT PPDU,
    wherein the data field includes a first 484-tone resource unit (RU) and a second 484-tone RU, and the first 484-tone RU is duplicated to the second 484-tone RU,
    wherein the STF is configured based on an STF sequence defined for 80 MHz transmission, and
    wherein the LTF is configured based on an LTF sequence defined for 80 MHz transmission; and
    transmitting the EHT PPDU.

2. The method of claim 1, wherein the STF sequence is defined as:

$$\{M,1,-M,0,-M,1,-M\}\cdot(1+j)/\sqrt{2},$$

wherein M is defined as:
$\{-1, -1, -1, 1, 1, 1, -1, 1, 1, 1, -1, 1, 1, -1, 1\}$.

3. The method of claim 1, wherein the EHT-SIG field includes a modulation and coding scheme (MCS) field related to MCS information applied to the data field,
    wherein the first 484-tone RU is modulated based on a binary phase shift keying (BPSK) technique and a dual carrier modulation (DCM) technique.

4. The method of claim 1, wherein the EHT PPDU is transmitted through a 6 GHz band without preamble puncturing.

5. The method of claim 1, wherein a sign change is applied to at least a part of the second 484-tone RU to reduce peak-to-average power ratio (PAPR).

6. A station (STA) in a wireless local area network (LAN) system, the STA comprising:
    at least one processor; and
    at least one computer memory operably connectable to the at least one processor and storing instructions that, based on being executed by the at least one processor, perform operations comprising:
    generating an extremely high throughput (EHT) physical protocol data unit (PPDU) based on a duplicate transmission mode,
    wherein the EHT PPDU includes a universal signal (U-SIG) field for interpreting the EHT PPDU, an EHT signal (EHT-SIG) field being contiguous to the U-SIG field, a short training field (STF) being contiguous to the EHT-SIG field, a long training field (LTF) being contiguous to the STF, and a data field being contiguous to the LTF;
    wherein the U-SIG field has a length of 2 symbols,
    wherein the U-SIG field includes a type field having a length of 2 bits, and a value of the type field is related to the duplicate transmission mode,
    wherein the EHT PPDU is an 80 MHZ EHT PPDU, the U-SIG field is duplicated over each 20 MHz subchannel in the 80 MHz EHT PPDU, and the EHT-SIG field includes a content channel which is duplicated over each 20 MHz subchannel in the 80 MHz EHT PPDU, wherein the data field includes a first 484-tone resource unit (RU) and a second 484-tone RU, and the first 484-tone RU is duplicated to the second 484-tone RU, wherein the STF is configured based on an STF sequence defined for 80 MHz transmission, and wherein the LTF is configured based on an LTF sequence defined for 80 MHz transmission; and transmitting the EHT PPDU.

7. The STA of claim 6, wherein the STF sequence is defined as:

$$\{M,1,-M,0,-M,1,-M\}\cdot(1+j)/\sqrt{2},$$

wherein M is defined as:

$\{-1, -1, -1, 1, 1, 1, -1, 1, 1, 1, -1, 1, 1, -1, 1\}$.

8. The STA of claim 6, wherein the EHT-SIG field includes a modulation and coding scheme (MCS) field related to MCS information applied to the data field, wherein the first 484-tone RU is modulated based on a binary phase shift keying (BPSK) technique and a dual carrier modulation (DCM) technique.

9. The STA of claim 6, wherein the EHT PPDU is transmitted through a 6 GHz band without preamble puncturing.

10. The STA of claim 6, wherein a sign change is applied to at least a part of the second 484-tone RU to reduce peak-to-average power ratio (PAPR).

11. A station (STA) in a wireless local area network (LAN) system, the STA comprising:

at least one processor; and at least one computer memory operably connectable to the at least one processor and storing instructions that, based on being executed by the at least one processor, perform operations comprising:

receiving an extremely high throughput (EHT) physical protocol data unit (PPDU) based on a duplicate transmission mode, wherein the EHT PPDU includes a universal signal (U-SIG) field for interpreting the EHT PPDU, an EHT signal (EHT-SIG) field being contiguous to the U-SIG field, a short training field (STF) being contiguous to the EHT-SIG field, a long training field (LTF) being contiguous to the STF, and a data field being contiguous to the LTF;

wherein the U-SIG field has a length of 2 symbols, wherein the U-SIG field includes a type field having a length of 2 bits, and a value of the type field is related to the duplicate transmission mode, wherein the EHT PPDU is an 80 MHZ EHT PPDU, the U-SIG field is duplicated over each 20 MHz subchannel in the 80 MHz EHT PPDU, and the EHT-SIG field includes a content channel which is duplicated over each 20 MHz subchannel in the 80 MHz EHT PPDU, wherein the data field includes a first 484-tone resource unit (RU) and a second 484-tone RU, and the first 484-tone RU is duplicated to the second 484-tone RU, wherein the STF is configured based on an STF sequence defined for 80 MHz transmission, and wherein the LTF is configured based on an LTF sequence defined for 80 MHz transmission.

12. The STA of claim 11, wherein the STF sequence is defined as:

$$\{M, 1, -M, 0, -M, 1, -M\}\cdot(1+j)/\sqrt{2},$$

wherein M is defined as:

$\{-1, -1, -1, 1, 1, 1, -1, 1, 1, 1, -1, 1, 1, -1, 1\}$.

13. The STA of claim 11, wherein the EHT-SIG field includes a modulation and coding scheme (MCS) field related to MCS information applied to the data field, wherein the first 484-tone RU is modulated based on a binary phase shift keying (BPSK) technique and a dual carrier modulation (DCM) technique.

14. The STA of claim 11, wherein the EHT PPDU is transmitted through a 6 GHz band without preamble puncturing.

15. The STA of claim 11, wherein a sign change is applied to at least a part of the second 484-tone RU to reduce peak-to-average power ratio (PAPR).

* * * * *